United States Patent
Beilin et al.

(10) Patent No.: US 9,992,010 B2
(45) Date of Patent: Jun. 5, 2018

(54) SYSTEM AND METHOD FOR AUGMENTING DUPLEXED REPLICATED COMPUTING

(71) Applicant: The Charles Stark Draper Laboratory, Inc., Cambridge, MA (US)

(72) Inventors: Samuel Beilin, Cambridge, MA (US); David Crane, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 253 days.

(21) Appl. No.: 14/951,416

(22) Filed: Nov. 24, 2015

(65) Prior Publication Data

US 2017/0149553 A1 May 25, 2017

(51) Int. Cl.
  *G06F 15/16* (2006.01)
  *H04L 7/00* (2006.01)
  *H04L 29/08* (2006.01)

(52) U.S. Cl.
  CPC ............ *H04L 7/0008* (2013.01); *H04L 67/10* (2013.01)

(58) Field of Classification Search
  CPC .............................. H04L 7/0008; G06F 11/181
  USPC ......................................................... 709/219
  See application file for complete search history.

(56) References Cited

U.S. PATENT DOCUMENTS

| | | | | |
|---|---|---|---|---|
| 4,907,232 A | * | 3/1990 | Harper ............... | G06F 11/18 714/11 |
| 5,404,363 A | * | 4/1995 | Krause ............... | G06F 1/12 714/814 |
| 6,073,251 A | | 6/2000 | Jewett et al. | |
| 6,411,633 B1 | * | 6/2002 | Wolf ............... | H04J 3/0647 370/503 |
| 6,434,712 B1 | * | 8/2002 | Urban ............... | G06F 11/181 714/10 |
| 6,550,018 B1 | * | 4/2003 | Abonamah ........ | G06F 11/165 714/11 |
| 7,013,305 B2 | * | 3/2006 | Elko ............... | G06F 11/2007 707/687 |

(Continued)

OTHER PUBLICATIONS

Avizienis, Algirdas, et al. "The STAR (self-testing and repairing) computer: An investigation of the theory and practice of fault-tolerant computer design." Computers, IEEE Transactions on 100. 11 (1971): 1312-1321.

(Continued)

*Primary Examiner* — Hamza N Algibhah
(74) *Attorney, Agent, or Firm* — Sunstein Kann Murphy & Timbers LLP

(57) ABSTRACT

Systems and methods are disclosed herein for a replicated fault-tolerant computer system. The system includes a triplet of network elements, which each maintain a clock signal, and a clock monitor at each network element for monitoring incoming clock signals. Each network interfaces with a fault containment region (FCR). The system provides the ability to transition from a duplex system to a triplex system if one of the previously offline FCRs can be brought back online. The network elements can determine or receive notification that the previously offline FCR can be brought back online, align their respective clock signals, and synchronize the memory state of the previously offline FCR. The system can then operate in a fault-tolerant, replicated triplex operating mode.

22 Claims, 12 Drawing Sheets

(56) References Cited

U.S. PATENT DOCUMENTS

| | | | | |
|---|---|---|---|---|
| 8,972,772 B2* | 3/2015 | Beilin | ................. | G06F 11/1604 |
| | | | | 714/4.2 |
| 2002/0164952 A1* | 11/2002 | Singhal | ................. | H01Q 1/125 |
| | | | | 455/39 |
| 2004/0090962 A1* | 5/2004 | Forest | ................. | H03M 13/43 |
| | | | | 370/392 |
| 2005/0281129 A1* | 12/2005 | Ikeda | ..................... | G11C 7/225 |
| | | | | 365/233.1 |
| 2006/0056263 A1* | 3/2006 | Otsuka | ................. | G11C 7/1018 |
| | | | | 365/230.03 |
| 2007/0188358 A1* | 8/2007 | Somayajula | ........ | H03M 1/0658 |
| | | | | 341/51 |
| 2009/0055676 A1* | 2/2009 | Wiebe | ....................... | G06F 1/06 |
| | | | | 713/501 |
| 2012/0221889 A1* | 8/2012 | Beilin | ................. | G06F 11/1604 |
| | | | | 714/12 |
| 2015/0121161 A1* | 4/2015 | Cousins | ............... | H04L 1/1858 |
| | | | | 714/749 |
| 2015/0372802 A1* | 12/2015 | Sadowski | ............... | G06F 13/38 |
| | | | | 370/503 |
| 2016/0127064 A1* | 5/2016 | Liu | ......................... | H04J 3/076 |
| | | | | 370/294 |
| 2017/0064606 A1* | 3/2017 | Lam | ..................... | H04W 40/12 |

OTHER PUBLICATIONS

Halpern, Joseph Y., et al. "Fault-tolerant clock synchronization." Proceedings of the third annual ACM symposium on Principles of distributed computing. ACM, 1984.

Ramanathan, Parameswaran, Kang G. Shin, and Ricky W. Butler. "Fault-tolerant clock synchronization in distributed systems." Computer 23.10 (1990): 33-42.

* cited by examiner

SYSTEM AND METHOD FOR AUGMENTING DUPLEXED REPLICATED COMPUTING

FIELD OF THE DISCLOSURE

The invention relates generally to computer systems, and more particularly to systems and methods for replicated fault-tolerant computing for allowing the operation of a replicated duplex system and a fault-tolerant replicated triplex and/or quadriplex system.

BACKGROUND OF THE DISCLOSURE

With the rapid technological developments in areas such as aviation, space travel, robotics, medical devices, and electronic financial systems, there is an increasing need for computer systems to be reliable and resilient to failure. Thus, there is an ever growing demand for reliable computing systems. Replicated computers executing identical operations can provide fault tolerance by comparing the outputs of each of the computers and determining which one of the computers may have generated an error during operation.

The fault tolerant parallel processor (FTPP) architecture provides replicated operation of commercial-off-the-shelf processing elements. This is accomplished by providing synchronization and data integrity services in a special purpose communication device called a network element, which links replicated processors and other elements in fault containment regions to the rest of the FTPP system. Currently, one of two canonical forms of reaching agreement in the presence of faults is used within the FTPP architecture: interactive convergence and interactive consistency.

Interactive convergence algorithms reach an agreement on a correct value by performing an average on the locally perceived values. The locally perceived values may be different for each observer, but the algorithm converges, within a known error bound, to the same result across all properly functioning observers. The benefit of convergence compared to interactive consistency is reduced rounds of communication.

Interactive consistency algorithms guarantee that all properly functioning observers see the same values and can then perform a value selection from identical data sets. The cost of removing the averaging error compared to an interactive convergence algorithm is increased rounds of communication.

In a triplex system, which includes three network elements and fault containment regions, interactive convergence algorithms do not have the resources needed to operate. Oral message versions of interactive consistency algorithms can be replaced by signed message versions for the triplex system to operate in Byzantine fault scenarios. However, once one of the fault containment regions fails leaving only two functional fault containment regions, an FTPP system can only continue to operate as a duplex system when clock duplication algorithms have been applied. This system is not fault tolerant. Many times there is a need to start as a duplex system for power conservation as there is limited battery power in some applications, such as the implantation of a medical device. However, for the critical applications where fault tolerance is required, the system must operate as triplex in order to execute those operations.

SUMMARY OF THE INVENTION

Therefore, there is a need in the art for a replicated parallel processing system that is able to recover from duplex mode to triplex mode or create a triplex mode from a duplex mode. Accordingly, systems and methods are disclosed herein for a replicated duplex computer system to transition from duplex mode to triplex mode. The system includes at least one excluded network element and a pair of network elements operating as a duplex. Each network element in the duplex maintains a clock signal, and includes a clock monitor for monitoring incoming clock signals. Each network element interfaces with a fault containment region (FCR). As used herein, in some implementations the network element may also be considered an element of a fault containment region. The system provides the ability to transition from a duplex system to a triplex system when both network elements in the duplex agree the third network element is to be integrated. The network elements are able to send their clock signals to the other network elements and receive their own clock signal and clock signals from the other elements. The clock monitors in each network element are configured to detect well-formed clock signals from the other network elements. If a clock monitor in one of the duplex network determines that a failed or previously offline FCR is generating a well-shaped clock signal, it can initiate a triplex transition process.

The systems, methods and devices of this disclosure each have several innovative aspects, no single one of which is solely responsible for the desirable attributes disclosed herein.

One innovative aspect of the subject matter described in this disclosure can be implemented in a system for providing replicated fault-tolerant computing configured to operate at least in a duplex mode and a triplex mode. The system can include at least a first, second, and third network elements. At least one of the network elements can include synchronization logic and a clock monitor. The synchronization logic can include a clock module configured to maintain a clock signal, an alignment module configured to synchronize the clock signal with a received clock signal, a data synchronization module configured to synchronize a memory state of the synchronization logic, and a synchronization control module configured to control the alignment module and the data synchronization module. The clock monitor can be configured to receive a clock signal of the first network element, a clock signal of the second network element, and a clock signal of the third network element. The clock monitor can be configured to transmit, using a switch controller of the clock monitor, a duplicated clock signal to the synchronization logic in place of the clock signal of the third network element. The clock monitor can be configured to determine that the clock signal of the third network element is valid. The clock monitor can be configured to connect, using the switch controller, the clock signal of the third network element to the synchronization logic.

In some implementations, the synchronization logic of the first network element can be configured to, upon determining that the clock signal of the third network element is valid, transmit a request to enter a recovery mode to the second network element. In some implementations, the data synchronization module of the first network element and the data synchronization module of the second network element can be configured to transmit synchronization data from each of a plurality of successive memory spaces to a data synchronization module of the third network element. The data synchronization module of the first network element and the data synchronization module of the second network element can be configured to receive echoed synchronization data from the data synchronization module of the third network element. The data synchronization module of the first network element and the data synchronization module of the second network element can be configured to verify the echoed synchronization data. In some implementations, the data synchronization module of the first network element can be configured to determine, by the data synchronization module of the first network element, that the echoed synchronization data does not match the synchronization data. The data synchronization module of the first network element can be configured to transmit, responsive to the determination, a notification to the clock monitor that the third network element is offline. In some implementations, the clock monitor can be configured to update, in response to the notification, a status of the third network element to offline in a mode register of the clock monitor. The clock monitor can be configured to disconnect, using the switch controller, the clock signal of third network element from the alignment module. The clock monitor can be configured to connect, using the switch controller, the duplicated clock signal to the alignment module. The clock monitor can be configured to notify the second network element and the third network element that the third network element is offline.

In some implementations, the clock monitor can be configured to determine whether the clock signal of the third network element is valid by determining that a duty cycle of the clock signal of the third network element falls within a predetermined range, and determining that a frequency of the clock signal of the third network element falls within a predetermined range. In some implementations, the clock monitor can be configured to determine that the clock signal of the third network element is valid by determining that the clock signal of the third network element has been valid for a predetermined period of time. In some implementations, the predetermined period can be at least one clock cycle.

In some implementations, the clock monitor of the first network element can be configured to detect an invalid clock pulse in the clock signal of the third network element. The clock monitor can disconnect, using the switch controller, the clock signal of the third network element from the synchronization logic. The clock monitor can connect, using the switch controller, the duplicated clock signal to the synchronization logic. The clock monitor can notify the second network element and the third network element that the third network element is offline. In some implementations, the clock monitor of the first network element can be configured to disconnect the clock signal of the third network element from the synchronization logic and connect the duplicated clock signal to the synchronization logic before receiving the next clock signal from a clock module of the first network element.

In some implementations, the synchronization logic of the first network element can be configured to receive, from the second network element, a notification that the third network element is offline, and the clock monitor of the first network element can be configured to disconnect, using the switch controller, the clock signal of the third network element from the synchronization logic. The synchronization logic of the first network element can be configured to connect, using the switch controller, the duplicated clock signal to the synchronization logic.

In some implementations, the clock monitor of the first network element can be configured to disconnect or ignore the duplicated clock signal upon determining that the clock signal of the third network element is valid.

Another innovative aspect of the subject matter described in this disclosure can be implemented in a method for providing replicated fault-tolerant computing among at least a first, second, and third network elements configured to operate at least in a duplex mode and a triplex mode. The method can include receiving, at a clock monitor of the first network element, a clock signal of the first network element, a clock signal of the second network element, and a clock signal of the third network element. The method can include transmitting, to synchronization logic of the first network element, a duplicated clock signal in place of the clock signal of the third network element. The method can include determining, by the clock monitor, that the clock signal of the third network element is valid. The method can include connecting, using the switch controller, the clock signal of the third network element to the synchronization logic.

In some implementations, the method can include transmitting, by the synchronization logic upon determining that the clock signal of the third network element is valid, a request to enter a recovery mode to the second network element. In some implementations, the method can include transmitting, by the data synchronization module of the first network element and a data synchronization module of the second network element, synchronization data from each of a plurality of successive memory spaces to a data synchronization module of the third network element. The method can include receiving, by the data synchronization module of the first network element and the data synchronization module of the second network element, echoed synchronization data from the data synchronization module of the third network element. The method can include verifying, by the data synchronization module of the first network element and the data synchronization module of the second network element, the echoed synchronization data. In some implementations, the method can include, determining, by the data synchronization module of the first network element, that the echoed synchronization data does not match the synchronization data. The method can include transmitting, by the data synchronization module of the first network element, a notification to the clock monitor to update the status of the third network element to offline in a mode register of the clock monitor. The method can include updating, by the clock monitor in response to the notification, a status of the third network element to offline in a mode register of the clock monitor. The method can include disconnecting, using the switch controller, the clock signal of third network element from the alignment module. The method can include connecting, using the switch controller, the duplicated clock signal to the synchronization logic. The method can include notifying, by the clock monitor, the second network element and the third network element that the third network element is offline.

In some implementations, determining that the clock signal of the third network element is valid can include determining, by the clock monitor, that a duty cycle of the clock signal of the third network element falls within a predetermined range. The method can include determining, by the clock monitor, that a frequency of the clock signal of the third network element falls within a predetermined range. In some implementations, determining that the clock signal of the third network element is valid can include determining, by the clock monitor, that the clock signal of the third network element has been valid for a predetermined period of time. In some implementations, the predetermined period of time can be at least one clock cycle.

In some implementations, the method can include detecting, by the clock monitor, an invalid clock pulse in the clock signal of the third network element. The method can include disconnecting, using the switch controller, the clock signal of the third network element from the synchronization logic. The method can include connecting, using the switch controller, the duplicated clock signal to the synchronization logic. The method can include notifying, by the clock monitor, the second network element and the third network element that the third network element is offline. In some implementations, the clock monitor can disconnect the clock signal of the third network element from the synchronization logic and connects the duplicated clock signal to the synchronization logic before receiving the next clock signal from a clock module of first network element.

In some implementations, the method can include receiving, by the synchronization logic from the second network element, a notification that the third network element is offline. The method can include disconnecting, using the switch controller, the clock signal of the third network element from the synchronization logic. The method can include connecting, using the switch controller, the duplicated clock signal to the synchronization logic.

In some implementations, the method can include disconnecting or ignoring, by the clock monitor, the duplicated clock signal upon determining that the clock signal of the third network element is valid.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

The system and method may be better understood from the following illustrative description with reference to the following drawings in which.

DESCRIPTION OF CERTAIN ILLUSTRATIVE EMBODIMENTS

Figure 1:
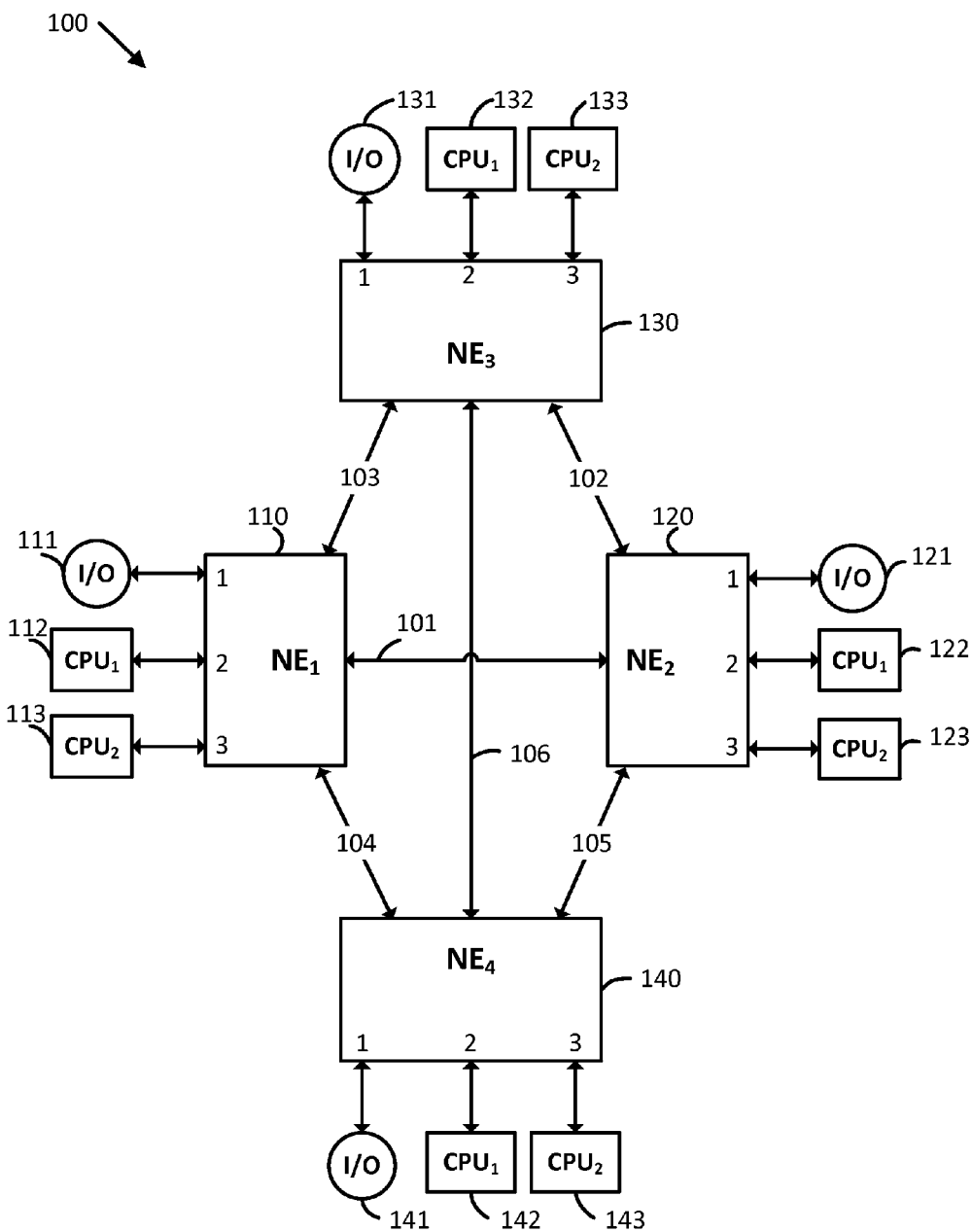
FIG. 1 is a block diagram showing an example quadriplex system for replicated, fault-tolerant computing.

To provide an overall understanding of the invention, certain illustrative embodiments will now be described, including systems and methods for replicated duplex computing and fault-tolerant, replicated triplex computing. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

A computing system including three fault containment regions (FCRs) operating in a fault-tolerant, replicated triplex operational state achieves its fault tolerance using a voting circuit that can detect when one of the FCRs produces faulty data. As long as two FCRs are in agreement, the voting circuit can rely on the agreed upon data. A triplex system can be resilient as a single faulty FCR will not prevent the overall system from operating. If one FCR goes offline or is taken offline, the remaining two FCRs can continue to operate in a replicated duplex operational state. Transition from triplex to duplex mode is described in detail in U.S. Pat. No. 8,972,772, incorporated herein by reference. The replicated duplex operational state is not fault-tolerant, however, because if the voting circuit receives a different result from each FCR, it will not know which, if either, FCR is providing valid results. It is therefore desirable to provide FTPP systems with the ability to integrate an offline FCR into a replicated duplex system to form a fault-tolerant, replicated triplex system. The ability to integrate an FCR that was previously offline, either because it was previously found to be faulty or was kept offline to reduce power consumption, provides additional benefits. For example, in applications where power conservation is desirable, an FTPP system can be run in a replicated duplex operating mode until such time as the fault tolerance of a triplex operating mode is needed. The systems and methods described herein provide for integrating a previously offline FCR into a replicated duplex system to form a fault-tolerant, replicated triplex system.

In some embodiments, each network element interfaces with a general purpose processor. The processors may be configured to execute identical operations. The processors may be configured to communicate with other network elements' processors by transmitting and receiving messages. In one embodiment, a processor associated with one network element is different from a processor associated with another network element.

In one embodiment, the network elements are configured to maintain synchronization with the other network elements. The clock monitor at each network element may be configured to observe at least one metric, such as a frequency or a duty cycle, of the received clock signals. The clock monitor may be in communication with a mode register that maintains the current status of each FCR in a memory.

FIG. 1 is a block diagram showing an example quadriplex system 100 for replicated, fault-tolerant computing. Fault-tolerant computer (FTC) systems are designed to continue operating properly in the event of a failure of one or more components. FTC systems can be robust to several possible types of failures, including but not limited to hard disk failures, input or output device failures, software bugs and errors, interface errors, operator errors, bad command sequences, and physical damage caused by stressors such as shock, vibration, radiation, and extreme temperatures. FTC systems are useful in machines built to last a long time without any maintenance, such as space systems; computers that must be very dependable and require constant monitoring, such as monitor and control computers for nuclear power plants or supercollider experiments; and computers with high runtimes and heavy use, such as supercomputers for probability monitoring. However, the computer system disclosed herein is not limited to these types of applications.

The quadriplex system 100 includes four fault containment regions (FCRs) operating in parallel, all in direct communication with each other. The fault tolerance is provided by replication; each network element executes the same tasks and sends its results to a voting circuit (not shown), which chooses the correct result based on a quorum. If one of the FCRs has a failure, it may return a result that is different from the results returned by the other FCRs. When the voting circuit compares the results, it determines that the result provided by the majority of the FCRs, in this case, the other three FCRs, is correct. The quadriplex system 100 is tolerant to most types of faults, including Byzantine faults, as are higher-order systems, such as quintplex (five FCRs) and up.

For the parallel computing and voting circuit to function properly, the network elements must be properly aligned in time. Accordingly, each network element will produce a clock signal, compare its own clock signal with the clock signals from the other network elements, and align its clock signal with the other clock signals. The direct communication links, labeled 101 through 106 in FIG. 1, between the network elements are used to transmit the clock signals among the network elements. The direct communication links can include hard wired links; for example, copper or fiber optic cables. The direct communication links can be wireless. Each network element knows the delay of each communication link connected to it so that it can correct for the delays when comparing the clock signals.

The first network element bus 110 is operably connected to at least one input/output (I/O) system 111 and two processing elements 112 and 113 (CPU1 and CPU2, respectively). The processing units perform different functions; for example, CPU1 112 may be synchronization logic configured to compare clock signals and synchronize its clock the clock signals from the other network elements. CPU2 113 may be configured to execute external requests that are performed by each CPU2 113, 123, 133, and 143 in parallel. Additional processing units may be connected to each network element bus. The processing elements associated with network elements 110, 120, 130, and 140 may be the same or different. For example, one network element may be associated with a third processing element to execute a task that does not require redundancy or replication. In another embodiment, processing element 113, which is configured to execute the external requests, may be different from at least one of processing elements 123, 133, and 143. This creates a diverse system, wherein multiple different implementations are utilized so that the system is robust if there is a failure in a specific implementation (in this case, a specific processor). Any of the processing elements may be in direct or indirect communication with any processing elements of other FCRs.

The I/O system 111 may include one or more elements (e.g. modem, Ethernet device, Wi-Fi device, disk drive, screen, touchscreen, mouse, keyboard, microphone, printer, etc.) for receiving information from and transmitting information to the fault-tolerant parallel processor (FTPP) system, a human operator, or an external system. One input is a request to execute a task. The corresponding output is the result from this task, which would be communicated to the voting circuit. The output may also be displayed on a monitor, or sent to a central monitoring system for reporting or displaying the outputs of all FCRs. In this embodiment, one or more I/O elements may be connected to multiple network element buses; for example, a single keyboard may be connected to all network elements 110, 120, 130, and 140, so that instructions entered by an operator via a keyboard are sent directly to each FCR. The I/O system 111 may be used by a system monitor or an automatic system for debugging the FCR. The elements of I/O systems 111, 121, 131, and 141 need not be identical; for example, I/O system 111 may include an I/O device used on performing a function not performed by the other FCRs. I/O data can be broadcast to and received from a single network element, with that network element propagating messages to and from the other network elements. For example, an external command to integrate a new network element into the system can be received by all online network elements, or by only one network element, with the receiving network element transmitting the message to the other network elements. The I/O system may further include a buffer, e.g. a first-in, first-out buffer, for storing received messages or messages to be sent.

Figure 2A:
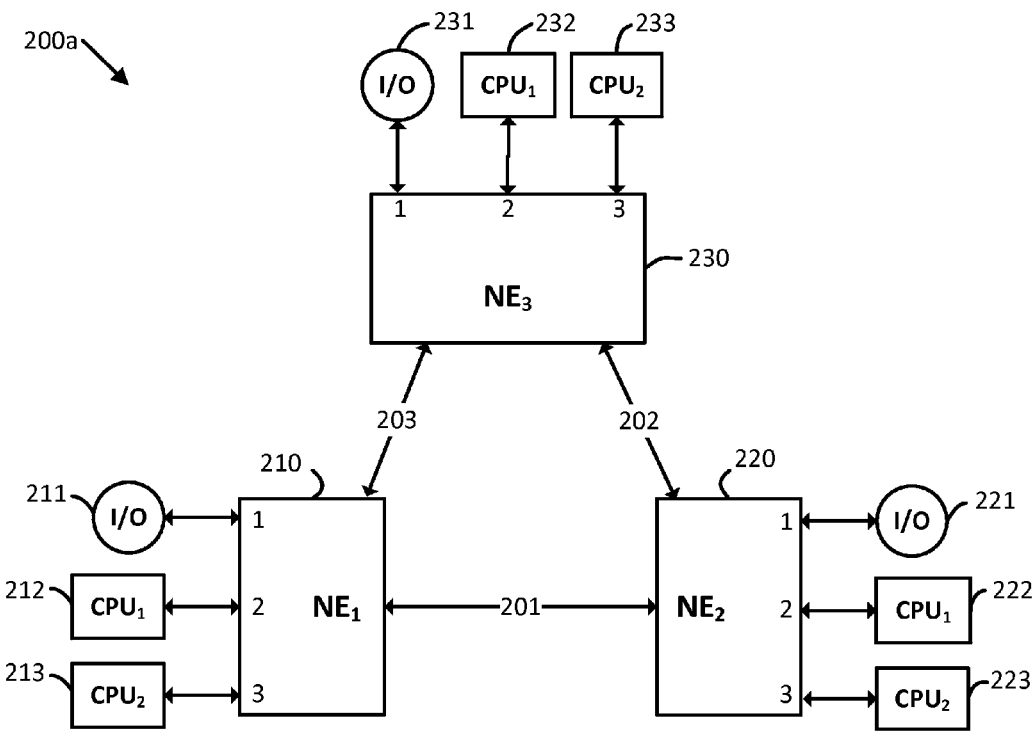
FIG. 2A is a block diagram showing an example triplex system for replicated, fault-tolerant computing.

FIG. 2A is a block diagram showing an example triplex system 200a for replicated, fault-tolerant computing. FIG. 2A consists of network elements 210, 220, and 230, which are similar to network elements 110, 120, and 130, respectively, of FIG. 1. If any FCR, in this case the FCR associated with network element 140, of the quadriplex system 100 experiences a fault or failure that cannot be resolved or corrected, then to conserve resources, the faulty FCR may be disabled, powered down, or otherwise taken offline, leaving a triplex system. Even if the faulty FCR is still operating, it is ignored by the voting circuit and clock monitors at the remaining network elements, creating the triplex system 200a for use in the replicated processing and voting procedure. Historically, a triplex system is not tolerant to any additional faults. By relaxing the constraint of full Byzantine resilience or substituting a signed message interactive consistency algorithm, the triplex system can in some cases tolerate an additional fault. In addition, using the clock signal duplication discussed with relation to FIGS. 2B through 5, the FTC system can continue to maintain synchronization and function properly in the duplex mode of operation.

Figure 2B:
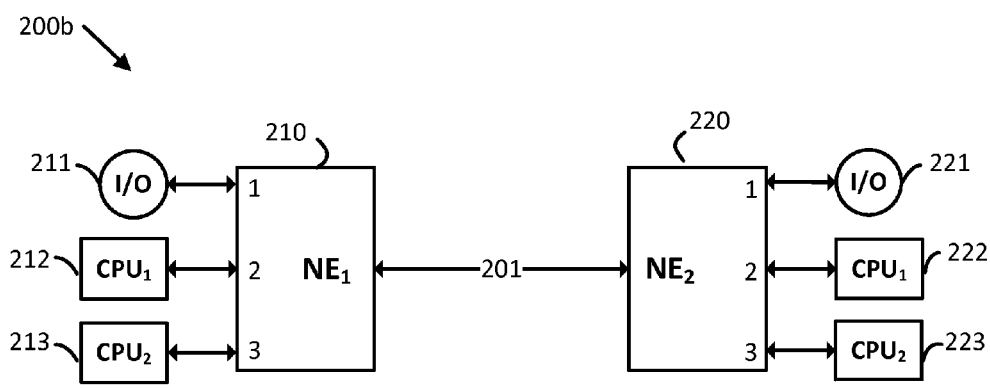
FIG. 2B is a block diagram showing an example duplex system for replicated computing.

FIG. 2B is a block diagram showing an example duplex system 200b for replicated computing. The duplex system 200b consists only of network elements 210 and 220. If any FCR, in this case the FCR associated with network element 230 from the triplex system 200a, experiences a fault or a failure, a triplex system is reduced to a duplex system. The duplex system 200b is no longer fault-tolerant: if one of the FCRs fails, there will be only a single network element still functioning, making parallel computing impossible. However, the voting circuit (not shown) of the duplex system 200b is able to detect faults, so running in duplex mode still provides confirmation that the FCRs are not faulty. For the self-checking pair to operate properly, their clock signals must still be aligned. The method for transitioning into and operating in duplex mode is discussed in detail in relation to FIGS. 4A, 4B, and 5.

Figure 3:
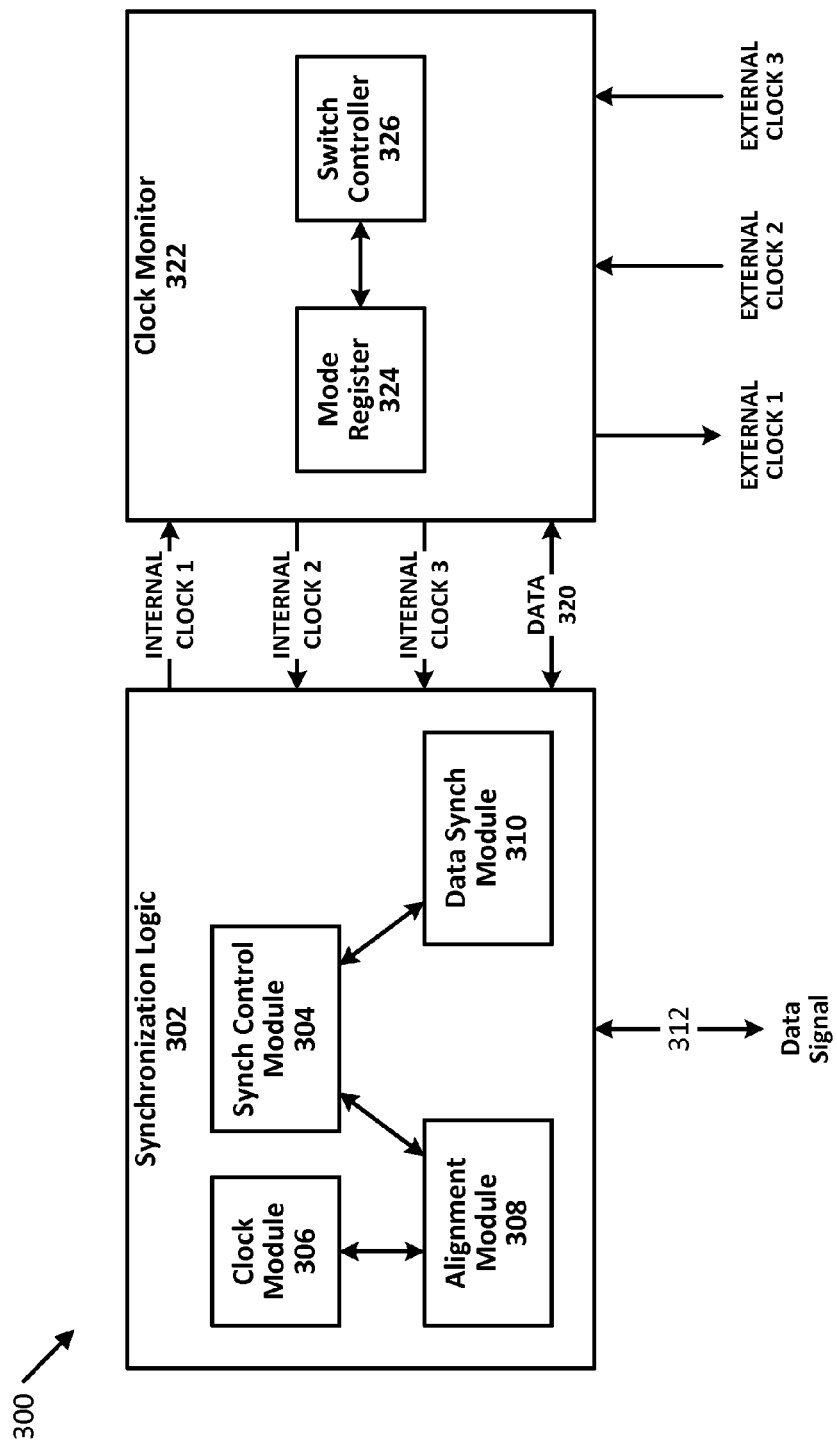
FIG. 3 is block diagram showing an example network element in a system for replicated, fault-tolerant computing.

FIG. 3 is block diagram showing an example network element 300 in a system for replicated, fault-tolerant computing. The network element 300 can make up one or more of the network elements 110, 120, 130, and 140 configured to provide a replicated fault-tolerant computing system as shown in FIG. 1. The system can additionally include second and third network elements for operating in a duplex operational mode or a triplex operational mode. The network element 300 can include synchronization logic 302 and a clock monitor 322. The synchronization logic 302 can include a synchronization control module 304, a clock module 306, an alignment module 308, and a data synchronization module 310. The clock monitor 322 can include a mode register 324 and a switch controller 326. The synchronization logic 302 and clock monitor 322 can be implemented in logic, such as an application-specific integrated circuit (ASIC) or a field-programmable gate array (FPGA); or in software executed on a microprocessor. As used herein, a module can be a logical collection of hardware components or circuitry defining a particular function, one or more subroutines implemented in software to define a particular function, or a combination of hardware and software elements.

The synchronization logic 302 can transmit and receive one or more data signals 312. The data signal 312 can carry operational data to and from I/O 111, CPU1 112, CPU2 113, and the voting circuit. The synchronization logic 302 can transmit and receive DATA 320 to and from the clock monitor 322. The DATA 320 can include state information, notifications, and instructions concerning the status of each network element and commands to bring a network element online or take it offline. The synchronization logic can transmit a first clock signal, INTERNAL CLOCK 1, to the clock monitor 322. INTERNAL CLOCK 1 can be the clock signal generated by the clock module 306. The synchronization logic 302 can receive a second clock signal, INTERNAL CLOCK 2, and a third clock signal, INTERNAL CLOCK 3. INTERNAL CLOCK 2 and INTERNAL CLOCK 3 can respectively correspond to EXTERNAL CLOCK 2 received from a second network element and EXTERNAL CLOCK 3 received from a third network element, during operation when the second and third network elements are online. In the event of a faulty clock signal or other indication that one of the other network elements is offline, the clock monitor 322 can replace INTERNAL CLOCK 2 or INTERNAL CLOCK 3 with a duplicated clock signal. The clock monitor 322 can generate the duplicated clock signal from either a valid external clock signal (e.g., EXTERNAL CLOCK 2 or EXTERNAL CLOCK 3) or from the synchronization logic's 302 own INTERNAL CLOCK 1. Although FIG. 3 shows only two external clock signals into the clock monitor, out of the clock monitor, and into the synchronization logic, there may be more clock signals not shown that could be used for higher-order FTC systems, such as the quadriplex system shown in FIG. 1.

Each synchronization logic 302 can include a clock module 306 configured to maintain a clock signal. The clock module 306 can be a crystal or other oscillator configured to generate a stable clock signal. The clock module 306 can be internal or external to the other modules of the synchronization logic 302. The clock module 306 can generate INTERNAL CLOCK 1, which the synchronization logic 302 transmits to the clock monitor 322, and which the clock monitor 322 in turn transmits to the other network elements as EXTERNAL CLOCK 1. The synchronization logic 302 or the clock monitor 322 may modify the clock signal generated by the clock module 306; for example, the clock signal may be buffered, voltage shifted, divided to a lower frequency, multiplied to a higher frequency, phase locked, etc.

Figure 9:
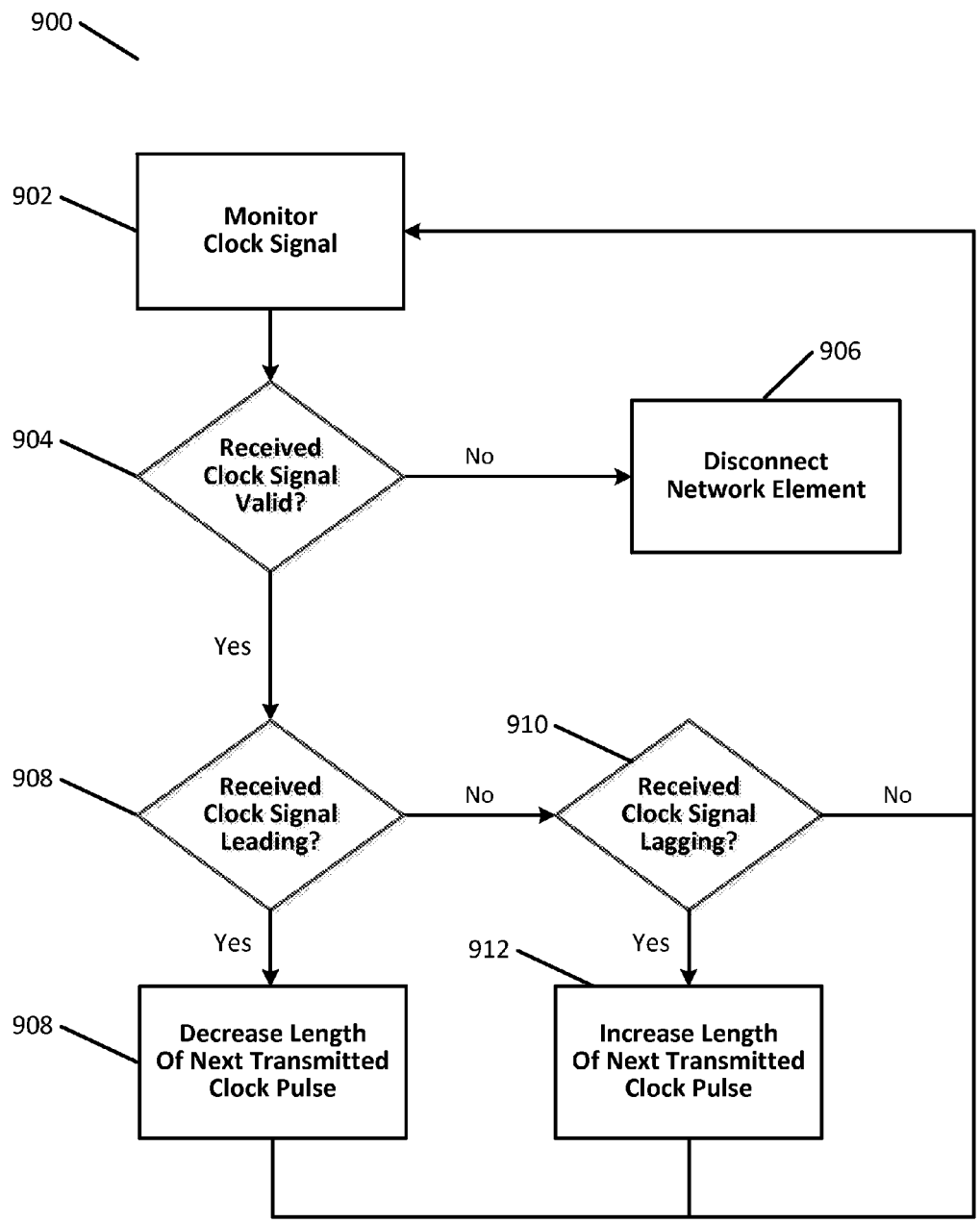
FIG. 9 is a flow diagram showing an example method for aligning clock signals in a system for replicated, fault-tolerant computing.
Figure 10:
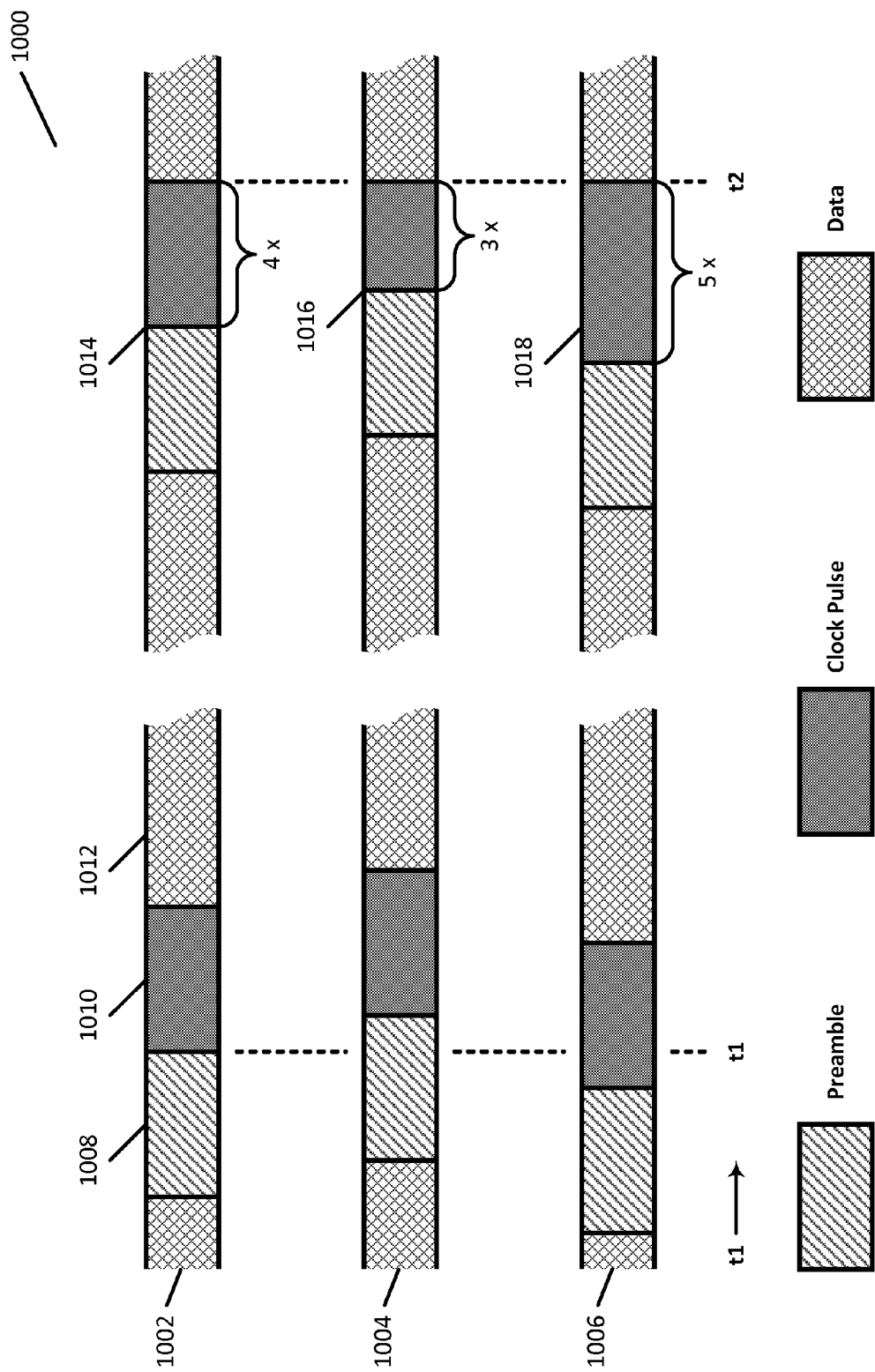
FIG. 10 is a timing diagram showing an example of clock signals being brought into alignment.

Each synchronization logic 302 can include an alignment module 308 configured to synchronize the clock signal maintained by the clock module 306 with one or more clock signals received from other FCRs. The alignment module 308 can receive the clock signal from the clock module 306, generate INTERNAL CLOCK 1, and align it with INTERNAL CLOCK 2 and INTERNAL CLOCK 3. The alignment module 308 can employ edge detection to determine how well the three clock signals are synchronized. If the alignment module 308 detects that INTERNAL CLOCK 1 is out of synch with INTERNAL CLOCK 2 and INTERNAL CLOCK 3, the alignment module 308 can advance or delay INTERNAL CLOCK 1. For example, a clock pulse in the INTERNAL CLOCK 1 signal may nominally be four clock cycles long, where the clock cycles correspond to the frequency of the clock signal generated by the clock module 306. Successive clock pulses can be separated by a fixed number of clock cycles. The alignment module 308 can shorten the clock pulse to advance INTERNAL CLOCK 1 relative to INTERNAL CLOCK 2 and INTERNAL CLOCK 3 or lengthen the clock pulse to delay INTERNAL CLOCK 1 relative to INTERNAL CLOCK 2 and INTERNAL CLOCK 3. For example, if the alignment module 308 detects that INTERNAL CLOCK 1 is lagging INTERNAL CLOCK 2 and INTERNAL CLOCK 3, the alignment module 308 can generate a three-cycle clock pulse instead of a four cycle clock pulse. Because the clock pulse is followed by a fixed number of clock cycles, the leading edge of the next clock pulse will occur one clock cycle sooner. In another example, if the alignment module 308 detects that INTERNAL CLOCK 1 is leading INTERNAL CLOCK 2 and INTERNAL CLOCK 3, the alignment module 308 can generate a five-cycle clock pulse instead of a four cycle clock pulse. Because the clock pulse is followed by a fixed number of clock cycles, the leading edge of the next clock pulse will occur one clock cycle later. The alignment module 308 can continue adjusting the length of the clock pulse until each clock signal is in alignment, and keep the clock signals in alignment thereafter. A clock pulse of longer or shorter duration can be used; however, adjustments of only small increments are necessary as the clock signals from healthy network elements should drift little in frequency between successive clocks pulse, making more drastic adjustments unnecessary. A large drift in clock signal frequency may be indicative of an invalid clock signal and a faulty network element. In such a case it may be preferable to take the network element offline rather than attempt to align other clock signals to it. In continuing operation, the alignment module 308 can make occasional adjustments as necessary to maintain alignment of the clocks signals. FIGS. 9 and 10, described below, illustrates an example of this process.

Each synchronization logic 302 can include a data synchronization module 310 configured to synchronize a memory state of the network element with a memory state of another network element. The data synchronization module 310 of an online network element 300 can transmit synchronization data from each of a plurality of successive memory spaces to a data synchronization module of a network element that is being brought online. The data synchronization module 310 can receive echoed synchronization data from the data synchronization module of the network element that is being brought online. The data synchronization module 310 can verify the echoed synchronization data to make sure that the network element being brought online can receive, process, and transmit data properly. The data synchronization module 310 can verify the echoed synchronization data by determining that it matches the synchronization data that the data synchronization module 310 transmitted. In some cases, the data synchronization module 310 determines that the echoed synchronization data does not match the synchronization data. This can indicate that the network element being brought online may not be receiving, processing, or transmitting data properly. The data synchronization module 310 can alert the clock monitor 322 and other online network elements that the network element being brought back online has a fault, and the attempted integration of the network element can be terminated.

Figure 8:
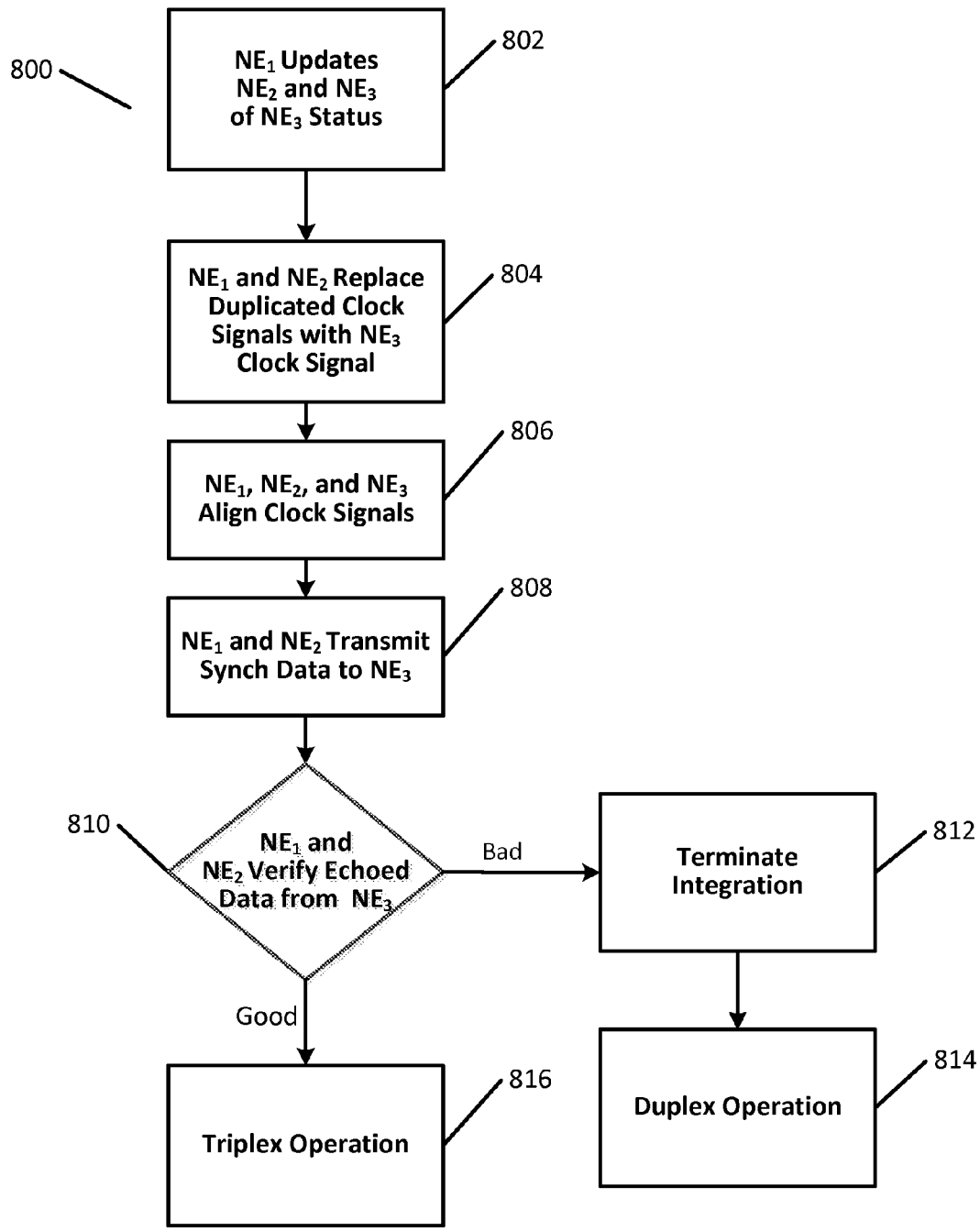
FIG. 8 is a flow diagram showing an example method for integrating a previously offline network element into a replicated duplex computing system to form a fault-tolerant, replicated triplex computing system.

In an example operation, the data synchronization module of a first network element and a second network element operating in a duplex mode can bring a third network element online to operate in a triplex mode. Following an initial clock signal alignment, the data synchronization modules of the first and second network elements can transmit synchronization data to a data synchronization module of the third network element. The data synchronization module of the third network element can transmit echoed synchronization data back to the data synchronization modules of the first and second network elements. The first and second network elements can receive and verify the echoed synchronization data. Once the three network elements have synchronized their memory states, they can begin operating in triplex mode. FIG. 8, described below, illustrates an example of this process.

Each synchronization logic 302 can include a synchronization control module 304 configured to control the alignment module 308 and the data synchronization module 310. The synchronization control module 304 need not be a physically distinct component, but can be integrated within the logic of the synchronization logic 302, or one of the alignment module 308 or the data synchronization module 310. The synchronization control module 304 can receive notifications from the alignment module 308 that the respective clock signals are aligned. For example, when the clock monitor 322 determines that EXTERNAL CLOCK 3 from the third network element, which had previously been offline, is valid, the clock monitor 322 can replace the duplicated clock signal with the EXTERNAL CLOCK 3 of the third network element. The alignment module 308 will begin receiving EXTERNAL CLOCK 3 in place of the duplicated clock signal; however, EXTERNAL CLOCK 3 may not be aligned with INTERNAL CLOCK 1, initially. Therefore, the respective alignment modules 308 of the network elements may have to bring their clock signals into alignment with each other before the integration process can continue. The clock module 322 and/or the alignment module 308 can determine that the clock signals are aligned and transmit a notification to the synchronization control module 304. The synchronization control module 304 can then notify the data synchronization module 310 that it may commence synchronizing the memory state of the network element being brought online. When the memory states of the network elements are synchronized, the data synchronization module 310 can notify the synchronization control module 304 that synchronization is complete. The synchronization control module 304 can then notify the clock monitors 322 of the network elements to update the status of the third network element to online. The synchronization control module 304 can notify any external processors of the FCR that the system is operating in triplex mode.

Each network element 300 can include a clock monitor 322. The clock monitor 322 can include a mode register 324 and a switch controller 326. The mode register 324 can maintain status information for the various network elements in the system. The mode register 324 can receive updates on individual network element status from the clock monitor 322, the synchronization logic 302, another network element, or another processor of the FCR. The switch controller 326 can route clock signals received from the other network elements to the synchronization logic 302. In the event that one of the other network elements is offline, the switch controller 326 can route a duplicated clock signal to the synchronization logic 302 to replace the clock signal of the offline network element. The switch controller 326 can generate the duplicated clock signal from the clock signal of the synchronization logic (e.g., INTERNAL CLOCK 1) or the clock signal of an online, non-faulty network element (e.g., EXTERNAL CLOCK 2).

The clock monitor 322 can receive INTERNAL CLOCK 1 from the synchronization logic 302. The clock monitor 322 can pass INTERNAL CLOCK 1 through as EXTERNAL CLOCK 1 and transmit it to the other network elements. The clock monitor 322 can receive EXTERNAL CLOCK 2 from a second network element and EXTERNAL CLOCK 3 from a third network element. The clock monitor can transmit INTERNAL CLOCK 2 and INTERNAL CLOCK 3 to the synchronization logic 302. During periods of operation in which all network elements are online and producing valid clock signals and data, the clock monitor 322 can, via the switch controller 326, route EXTERNAL CLOCK 2 to INTERNAL CLOCK 2, and EXTERNAL CLOCK 3 to INTERNAL CLOCK 3. If one of the other network elements is offline, the clock monitor 322 can duplicate a valid clock signal and transmit it to the synchronization logic. For example, in the event that the clock monitor 322 deems EXTERNAL CLOCK 3 invalid, or the clock monitor 322 receives a notification that the network element transmitting EXTERNAL CLOCK 3 is faulty, the clock monitor 322 can, via switch controller 326, duplicate a valid clock signal and transmit it to the synchronization logic 302 via INTERNAL CLOCK 3. The clock monitor 322 can, via the switch controller 326, duplicate either EXTERNAL CLOCK 2 or the synchronization logic's 302 own INTERNAL CLOCK 1. In this manner the clock monitor 322 can ensure that the synchronization logic 302 receives two valid clock signals.

The clock monitor 322 can determine whether or not a clock signal of another network element is valid. For example, when operating in triplex mode in a system with three network elements, the clock monitors 322 in each network element can monitor the health of clock signals of the other network elements. The clock monitors 322 can monitor the frequency and duty cycle of the received clock signals. As described above with regard to clock signal alignment via the alignment module 308, the clock signal can include a clock pulse of adjustable duration followed by period of fixed duration, in number of clock cycles, before the next clock pulse. For example, the clock pulse can nominally be four cycles long. The alignment module 308 can generate shorter or longer clock pulses to bring clock signals into alignment. Once the clock signals of the network elements are aligned, however, they should drift very little over time if operating properly. Thus, the period of time between a rising edge of a clock pulse and a rising edge of a subsequent clock pulse should fall within a relatively narrow range corresponding to the amount of expected adjustment of clock pulse width. For example, the alignment module 308 may adjust the duration of a clock pulse by plus or minus one clock cycle. Therefore, if the clock monitor 322 detects that the rising edge of a clock pulse arrives, for example, one clock cycle sooner or later than expected, the clock monitor 322 can determine that the network element that transmitted that clock signal is operating normally. However, if the clock monitor 322 detects that the rising edge of a clock pulse arrives, for example, two or more clock cycles sooner or later than expected, the clock monitor 322 can determine that the network element that transmitted that clock signal is faulty. In the event the clock monitor 322 detects a faulty clock signal it can, via the switch controller 326, disconnect that clock signal from the synchronization logic 302 and replace the faulty clock signal with a duplicated clock signal. Alternatively, the clock monitor 322 can notify the synchronization logic 302 to disregard the faulty clock signal. The clock monitor 322 can replace the faulty clock signal with the duplicated clock signal quickly to ensure that the network element transmitting the faulty clock signal disrupts the alignment of the valid clock signals as little as possible. In some cases, the clock monitor 322 can replace the faulty clock signal with the duplicated clock cycle before the next rising edge of its own clock cycle. The clock monitor 322 may also update, in the mode register 324, the status of the network element transmitting the faulty clock signal to offline. The clock monitor 322 may also notify the synchronization logic 302 that the network element transmitting the faulty clock signal has gone offline and should be disregarded. The synchronization logic 302 can notify the other network elements that one of the network elements has gone offline. The other network elements may receive this notification, update their respective mode registers 324, disregard the faulty clock signal in favor of a duplicated clock signal, and disregard further data signal received from the offline network element.

If the clock monitor 322 detects two or more received clock signals arriving early or late, it may determine that its own clock signal is faulty. In the event the clock monitor 322 determines that its own clock signal is faulty it may update its own status in the mode register 324 to offline. The clock monitor 322 may also notify the synchronization logic 302 that its network element has gone offline. The synchronization logic 302 can notify the other network elements that it has gone offline.

In another example, when operating in duplex mode in a system with two online network elements and one offline network element, the clock monitors 322 in the online network elements can monitor the health of the clock signal of the offline network element. At some point in time the offline network element may regain health, be reset, or powered back on and start producing a valid clock signal. The clock monitors 322 of the online network elements may begin to detect a clock signal from the offline network element that has a frequency and duty cycle that each fall within a predetermined acceptable range. The clock monitor 322 may continue monitoring the clock signal of the offline network element for a predetermined period of time to make sure that the offline network element is indeed exhibiting a stable, valid clock signal. The clock monitor 322 may continue monitoring the clock signal of the offline network element for up to at least one clock cycle, multiple clock cycles, or 1 ms, 3 ms, 10 ms or longer before deeming the clock signal valid and initiating a recovery mode. The clock monitor 322 may use a timer to monitor the length of time during which it has received a valid clock signal. If at any point prior to the end of the predetermined period the clock monitor 322 detects that the clock signal is invalid, the clock monitor 322 can reset its timer and restart it when it begins receiving a valid clock signal again.

When the clock monitor 322 detects a valid clock signal from the offline network element for a sufficient period of time, it can notify the synchronization logic 302 that it is possible to enter a recovery mode to bring the offline network element back online. The synchronization logic 302 can transmit a request to the online network elements to enter the recovery mode. The clock monitor 322 can update the status of the offline network element to online in the mode register 324. The clock monitor 322 can, via the switch controller 326, connect the clock signal of the previously offline network element. The clock monitor 322 can also disconnect the duplicated clock signal from the synchronization logic 302; however, it is not necessary to disconnect the clock signal from the synchronization logic 302 if the clock signal is still valid. The alignment modules 308 of the network elements can bring the clock signals into alignment. The data synchronization modules 310 can synchronize the memory state of the previously offline network element to those of the online network elements.

If during the synchronization of network element memory states, however, one of the online network elements receives echoed synchronization data that does not match the transmitted synchronization data, data synchronization module 310 can transmit a notification to the clock monitor 322 that the previously offline network element is faulty. The clock monitor 322 can update the status of the previously offline network element to offline in the mode register 326. The clock monitor 322 can disconnect, via the switch controller 326, the clock signal of faulty network element from the alignment module. The clock monitor 322 can connect, via the switch controller 326, the duplicated clock signal to the synchronization logic. The clock monitor 322 can notify the online network elements that the previously offline network element is faulty.

Figure 4A:
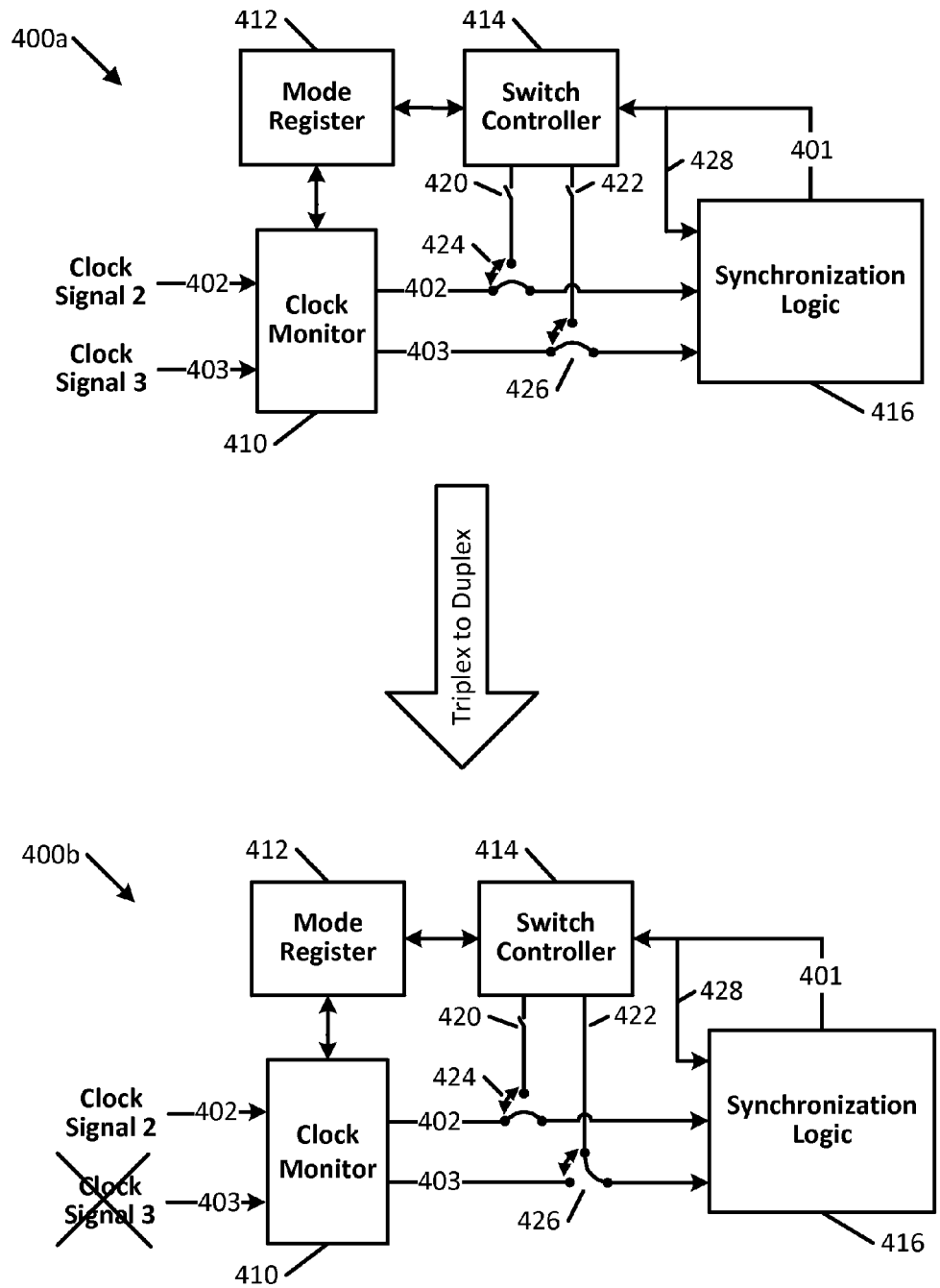
FIG. 4A is a block diagram showing an example transition of a network element from a fault-tolerant, replicated triplex operational state to a replicated duplex operational state.

FIG. 4A is a block diagram showing an example transition of a network element from a fault-tolerant, replicated triplex operational state 400a to a replicated duplex operational state 400b. The network element 400 described in FIG. 4A is similar to the network element 300 described in FIG. 3. In this example, the network element 400a replaces a faulty clock signal with a duplicate of its own clock signal. The network element 400a includes a clock monitor 410, a mode register 412, a switch controller 414, and synchronization logic 416. These elements may be implemented in an application-specific integrated circuit (ASIC), a field-programmable gate array (FPGA), or in software executed on a microprocessor. While in triplex operational state 400a, the clock monitor 410 receives incoming external clock signals from other clocks. Network element 1 is shown in FIG. 4A, so the clock monitor receives clock signals 2 (labeled 402) and 3 (labeled 403) from network elements 2 and 3, respectively. In triplex mode, network element 2 receives external clock signals 1 and 3, while network element 3 receives external clock signals 1 and 2. After receiving the clock signals, the clock monitor 410 calculates and analyzes signal metrics, such as clock signal frequency and duty cycle. The clock frequency may be in the range of about 1 kHz to about 8 GHz. In one embodiment, duty cycle is 50%, but the duty cycle may range from nearly 0% to nearly 100%, as long as the frequency is detectable. If one of these signal metrics varies from its expected value (e.g., the frequency is too high or low or the duty cycle is too high or too low), the clock monitor identifies that the clock signal has failed. The status of the clock monitors is stored in the mode register 412. The mode register 412 may also store the current mode of operation (e.g., duplex, triplex, quadriplex, etc.), which network elements are operational, or any other information. The mode register 412 may also be connected to a software register (not shown). In one embodiment, each incoming clock signal passes through a different, independent clock monitor, and all of the clock monitors are in communication with the mode register. If the clock monitor 410 determines that a clock signal is faulty, the clock monitor, the mode register, or another element alerts the other network elements of the failure. The system-wide transition from triplex to duplex is described in greater detail with respect to FIG. 5.

Switch controller 414 controls the positions of switches 420, 422, 424, and 426, which route the clock signals in different configurations based on which FCRs are operable. In some embodiments, switch controller 414 controls only switches 420 and 422, while the mode register 412 controls three-way switches 424 and 426. The mode register 412 may store or determine the switch positions for each configuration. Alternatively, the mode register 412 stores only whether or not each FCR is functional, and the switch controller 414 determines the correct switch pattern. In either embodiment, the switch controller 414 is in communication with the mode register 412, as shown. In addition, the switch controller receives the internal clock signal 401 from the synchronization logic 416. As will be described in relation to 400*b*, the internal clock signal sent to the switch controller 414 will be used in duplex operation. However, in triplex mode, as both switches 420 and 422 in the lines out of the switch controller are open, the clock signal 401 passed to the switch controller is not routed any farther. The three-way switches 424 and 426 are in their default states, allowing external clock signals 402 and 403 to pass through switches 424 and 426, respectively, to the synchronization logic 416. Although FIG. 4A shows only two external lines into the clock monitor, out of the clock monitor, and into the synchronization logic, there may be more lines not shown here that could be used for higher-order FTC systems, such as the quadriplex system shown in FIG. 1.

As seen in 400*a*, the synchronization logic receives external clock signals 402 and 403 and internal clock signal 401. The synchronization logic 416 synchronizes its clock signal by comparing its own internal clock signal 401 to the external clock signals 402 and 403 and adjusting its own clock signal using, for example, a phase-locked loop, or another method known in the art. The synchronization logic can be implemented using hardware, software, or a combination thereof.

After an FCR fails, e.g., the network element generating clock signal 3, the FTC system transitions from triplex mode into duplex mode, and the network element in triplex state 400*a* transitions to duplex operational state 400*b*. If the fault is in the clock signal 403, the clock monitor 410 may detect the failure and cause the transition to state 400*b* as described above, or a clock monitor in a different network element may detect the failure first and alert the other network elements. Alternatively, if the fault in the failed network element is not related to the network element's clock signal, the voting circuit (not shown) may determine that the FCR has failed. In this case, the failure is communicated from the voting circuit to the network element and stored in the mode register 412.

When the network element 400 transitions from triplex state 400*a* to duplex state 400*b*, the clock signal 403 from the failed element is no longer used in the synchronization process. The clock monitor 410 may still be receiving clock signal 403, but the mode register 412 and switch controller 414 prevent clock signal 403 from reaching the synchronization logic. The switch controller 414 closes switch 422, transmitting the internal clock signal 401 to the three-way switch 426. The position of the three-way switch 426 is also changed, either by the switch controller 414 or the mode register 412, to the configuration in 400*b*, preventing further transmission of failed clock signal 403 and transmitting the internal clock signal 401 to the synchronization logic 416. Thus, the failed clock signal 403 is replaced by internal clock signal 401 in the synchronization process. As in triplex state 400*a*, the switch 424 stays in its default position, which allows clock signal 402 to continue to the synchronization logic, and the internal clock signal 401 is still directly transmitted back to the synchronization logic through connection 428.

Since the internal clock signal 401 that passes through connection 428 travels through a different path from the internal clock signal 401 that passes through switch controller 414 and switches 422 and 426, the two copies of the internal clock signal 401 will be slightly offset from each other in time. In one embodiment, the offset may be up to about 80 ns. The processor 416 again uses a phase-locked loop or other method known in the art to adjust its own clock signal to the inputs; i.e., the two copies of the network element's internal clock signal 401 and the external clock signal 402. In this embodiment, the synchronization logic in the second network element (not shown) would receive two copies of its own internal clock signal 402 and a single external clock signal 401.

Figure 4B:
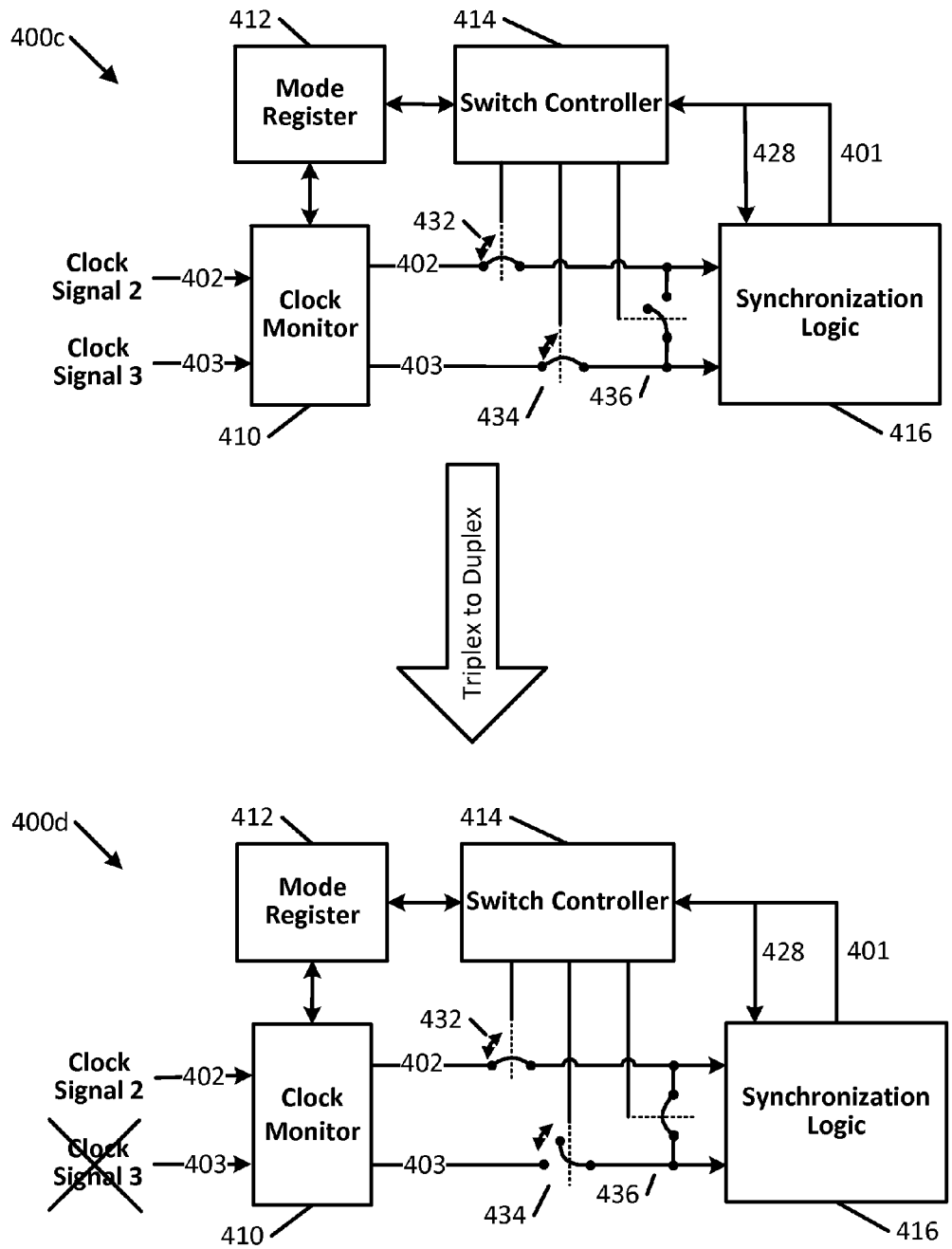
FIG. 4B is a block diagram showing another example transition of a network element from a fault-tolerant, replicated triplex operational state to a replicated duplex operational state.

FIG. 4B is a block diagram showing another example transition of a network element from a fault-tolerant, replicated triplex operational state 400*c* to a replicated duplex operational state 400*d*. The network element of FIG. 4B is similar to that of FIG. 4A, but differs in that it can replace a faulty clock signal with a duplicate of a non-faulty clock signal of another network element. After an FCR fails, e.g., the network element generating clock signal 3, the FTC system transitions from triplex mode into duplex mode, and the network element in triplex state 400*c* transitions to duplex operational state 400*d*. If the fault is in the clock signal 403, the clock monitor 410 may detect the failure and cause the transition to state 400*d*, or a clock monitor in a different network element may detect the failure first and alert the other network elements. Alternatively, if the fault in the failed network element is not related to the network element's clock signal, the voting circuit (not shown) may determine that the FCR has failed. In this case, the failure is communicated from the voting circuit to the network element and stored in the mode register 412.

When the network element 400 transitions from triplex state 400*c* to duplex state 400*d*, the clock signal 403 from the failed element is no longer used in the synchronization process. The clock monitor 410 may still be receiving clock signal 403, but the mode register 412 and switch controller 414 prevent clock signal 403 from reaching the synchronization logic. The switch controller 414 can instead direct a duplicate of clock signal 2 402 to the synchronization logic 416. The switch controller 414 can open the switch 434 to disconnect the clock signal 3 403 from the synchronization logic 416. The switch controller 414 can close the switch 436 to connect the clock signal 2 402 to the synchronization logic 416. In this manner, the synchronization logic 416 can now receive two clock signals: clock signal 2 402 and a duplicate of clock signal 2 402.

Figure 5:
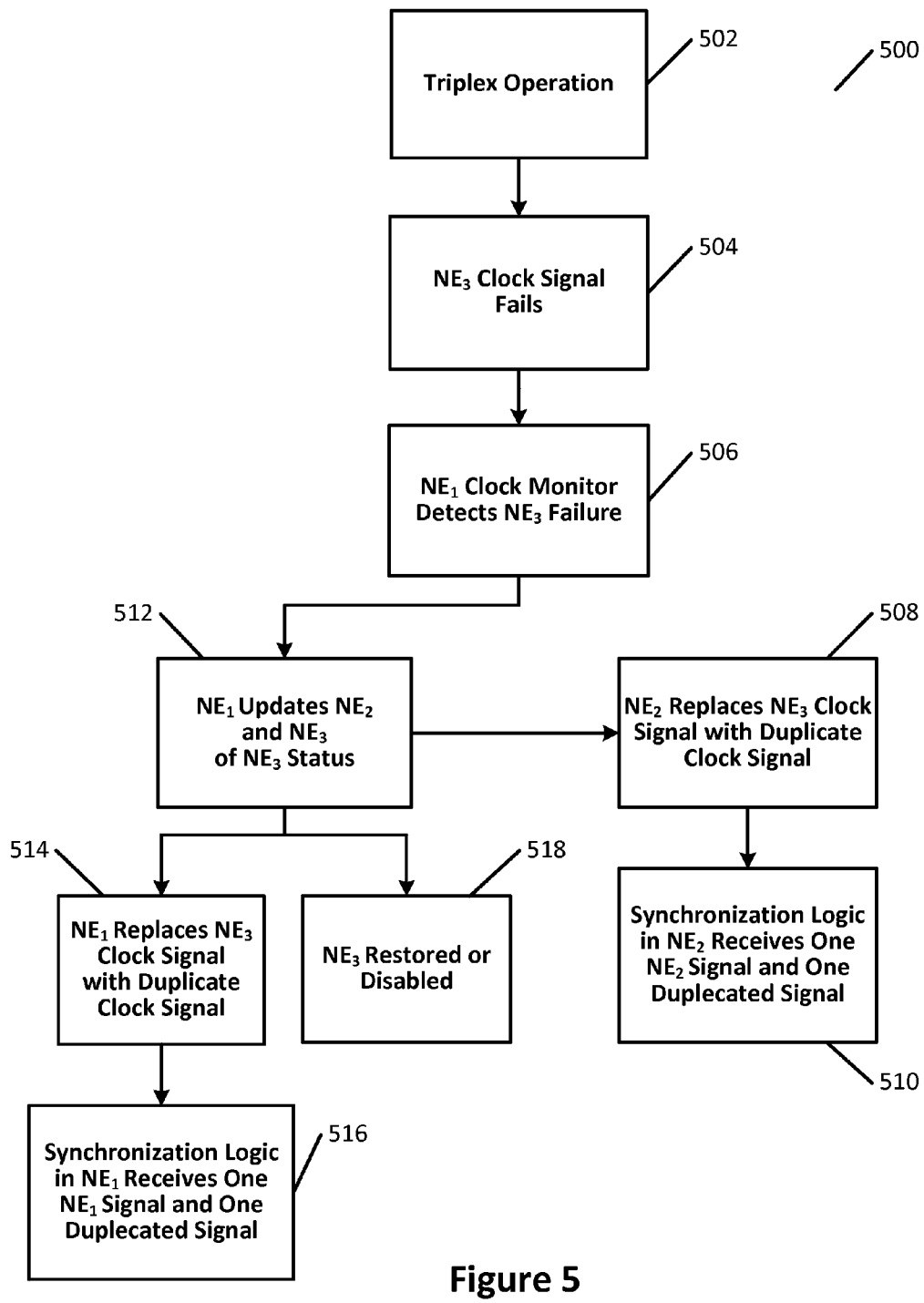
FIG. 5 is a flow diagram showing an example method for transitioning from a fault-tolerant, replicated triplex computing system to a replicated duplex system.

FIG. 5 is a flow diagram showing an example method 500 for transitioning from a fault-tolerant, replicated triplex computing system to a replicated duplex system. The sequence shown in FIG. 5 begins in triplex operation 502, but higher-order replicated systems, such as the quadriplex system shown in FIG. 1, may precede step 502. The example method 500 shown in FIG. 5 can be performed among a first, second, and third network element (NE1, NE2, and NE3, respectively) in the event NE3 experiences a failure.

If one FCR fails, in this case the FCR associated with NE3 (step 504), the system begins transitioning from the triplex mode to the duplex mode. In this sequence, the clock of NE3 fails, and the clock monitor of at least one network element, in this case NE1, detects that failure (step 506). As was discussed with respect to FIGS. 4A and 4B, other failures not related to the clock signal could occur and be detected by, for example, the voting circuit. In this case, the voting circuit or another monitoring element updates the mode registers of the network elements, and the functional network elements transition to duplex states as described with respect to FIGS. 4A and 4B.

Upon detecting the failure, the NE1 clock monitor sets two sequences in motion simultaneously. Internally, NE1 transitions to the duplex state, which was described in relation to FIGS. 4A and 4B. In this sequence, NE 1 replaces the NE3 clock signal with its internal NE1 clock signal (step 508), wherein this copy is slightly offset from the internal clock signal that is passed directly back into the synchronization logic. Thus, the two NE1 clock signals and a single clock signal from the other operational network element, in this case NE2, are passed to the NE1 synchronization logic (step 510), and the synchronization logic uses the received clock signals to adjust its own clock signal.

At the same time, NE1 can relay the information about the failure at NE3 to NE2 and NE3 (step 512). NE2, upon receiving the notification from NE1 that NE3 has failed, can transition into its duplex operational state, replacing the failed clock signal with a duplicated clock signal (step 514). NE2 can then receive at its synchronization logic a clock signal from NE1 as well as a duplicated clock signal to use in synchronizing its clock signal (step 516). The duplicated clock signal can be a duplicate of NE2's own clock signal, or a duplicate of NE1's clock signal. When NE3 receives notification that it has failed, the FTC system may attempt to restore the FCR. If this is not possible, the FTC system disables the FCR associated with NE3 to conserve system resources, protect the remaining FCRs, reduce system noise, etc. (step 518).

For illustrative purposes, in FIG. 5, NE1 detects a failure of NE3. However, any of the three network elements could fail, and any of the three network elements may detect the failure, with the system-wide transition proceeding in a similar manner to the transition shown and described in relation to FIG. 5. Alternatively, two or three network elements may simultaneously detect the same failure and transition from their triplex states to duplex states independently, before receiving a message from another network element. Furthermore, the failed network element may detect its own failure before it is detectable to the operational network elements, and the failed network element could send messages to the remaining network elements and disable itself.

Figure 6A:
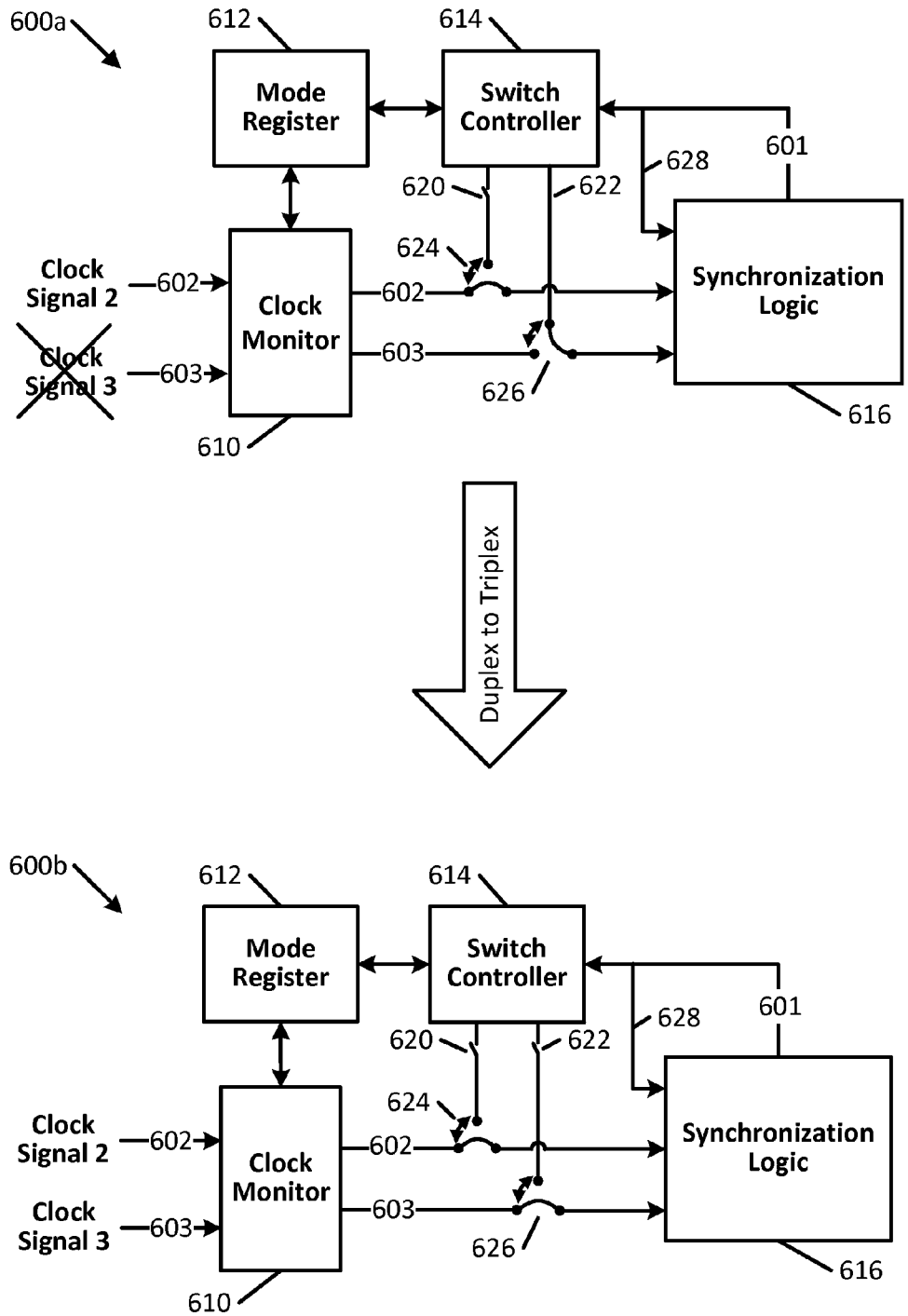
FIG. 6A is a block diagram showing an example transition of a network element from a replicated duplex operational state to a fault-tolerant, replicated triplex operational state.

FIG. 6A is a block diagram showing an example transition of a network element from a replicated duplex operational state 600a to a fault-tolerant, replicated triplex operational state 600b. The network element 600 can be similar to the network element 400 described in FIG. 4A. In this implementation, the synchronization logic 616 can receive a duplicate of its own internal clock signal 601 when operating in duplex mode. In duplex operation, the switch controller 614 can pass clock signal 2 602 to the synchronization logic 616 via the switch 624. The switch controller 614 can also receive the internal clock signal 601 from the synchronization logic 616, and pass a duplicate of that clock signal back to the synchronization logic 616 via the switch 626. This allows the synchronization logic 616 to align its clock signal to two clock signals, as it would during triplex operation.

The network element 600a can receive a notification to enter a network element integration mode. Alternatively, the network element 600a, via the clock monitor 610, can detect that clock signal 3 has become valid. In response, the network element 600a can begin a transition to a triplex operational mode 600b. The mode register 612 can update the status of the network element associated with clock signal 3 603 to online. The switch controller 614 can toggle the switch 626 to disconnect the duplicated clock signal and connect clock signal 3 603 to the synchronization logic 616. The synchronization logic 616 can begin clock signal alignment and memory state synchronization.

Figure 6B:
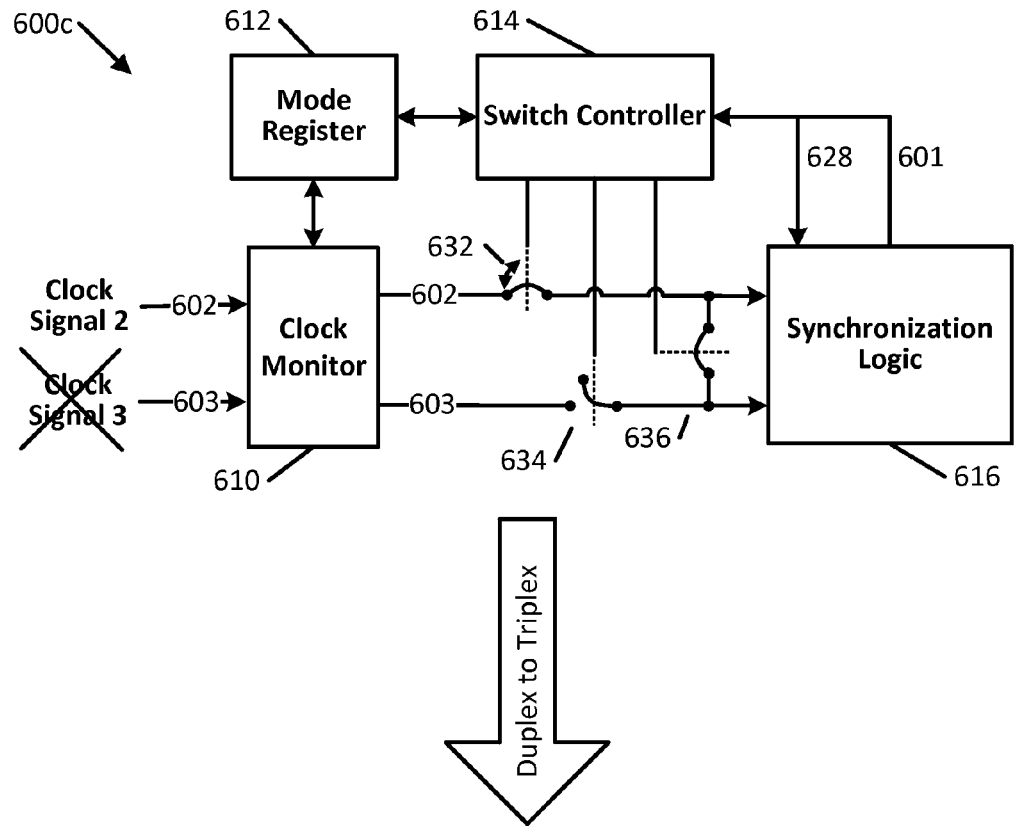
FIG. 6B is a block diagram showing another example transition of a network element from a replicated duplex operational state to a fault-tolerant, replicated triplex operational state.
Figure 6B:
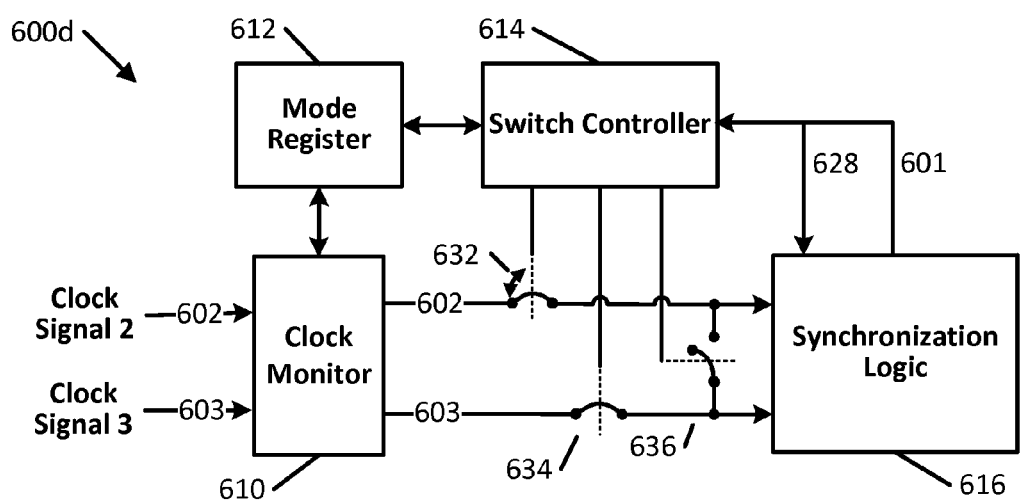

FIG. 6B is a block diagram showing another example transition of a network element from a replicated duplex operational state 600c to a fault-tolerant, replicated triplex operational state 600d. The network element 600 can be similar to the network element 400 described in FIG. 4B. In this implementation, the synchronization logic 616 can receive a duplicate of clock signal 2 602 when operating in duplex mode. In duplex operation, the switch controller 614 can pass clock signal 2 602 to the synchronization logic 616 via the switch 632. The switch controller 614 can also duplicate clock signal 2 602 using the switch 636 and transmit the duplicate clock signal to the synchronization logic 616. Meanwhile the switch controller 614 has disconnected clock signal 3 603 using the switch 634. This allows the synchronization logic 616 to align its clock signal to two clock signals, as it would during triplex operation.

The network element 600c can receive a notification to enter a network element integration mode. Alternatively, the network element 600c, via the clock monitor 610, can detect that clock signal 3 has become valid. In response, the network element 600c can begin a transition to a triplex operational mode 600d. The mode register 612 can update the status of the network element associated with clock signal 3 603 to online. The switch controller 614 can toggle the switch 636 to disconnect the duplicated clock signal. The switch controller 614 can toggle the switch 634 to connect clock signal 3 603 to the synchronization logic 616. The synchronization logic 616 can begin clock signal alignment and memory state synchronization.

Figure 7:
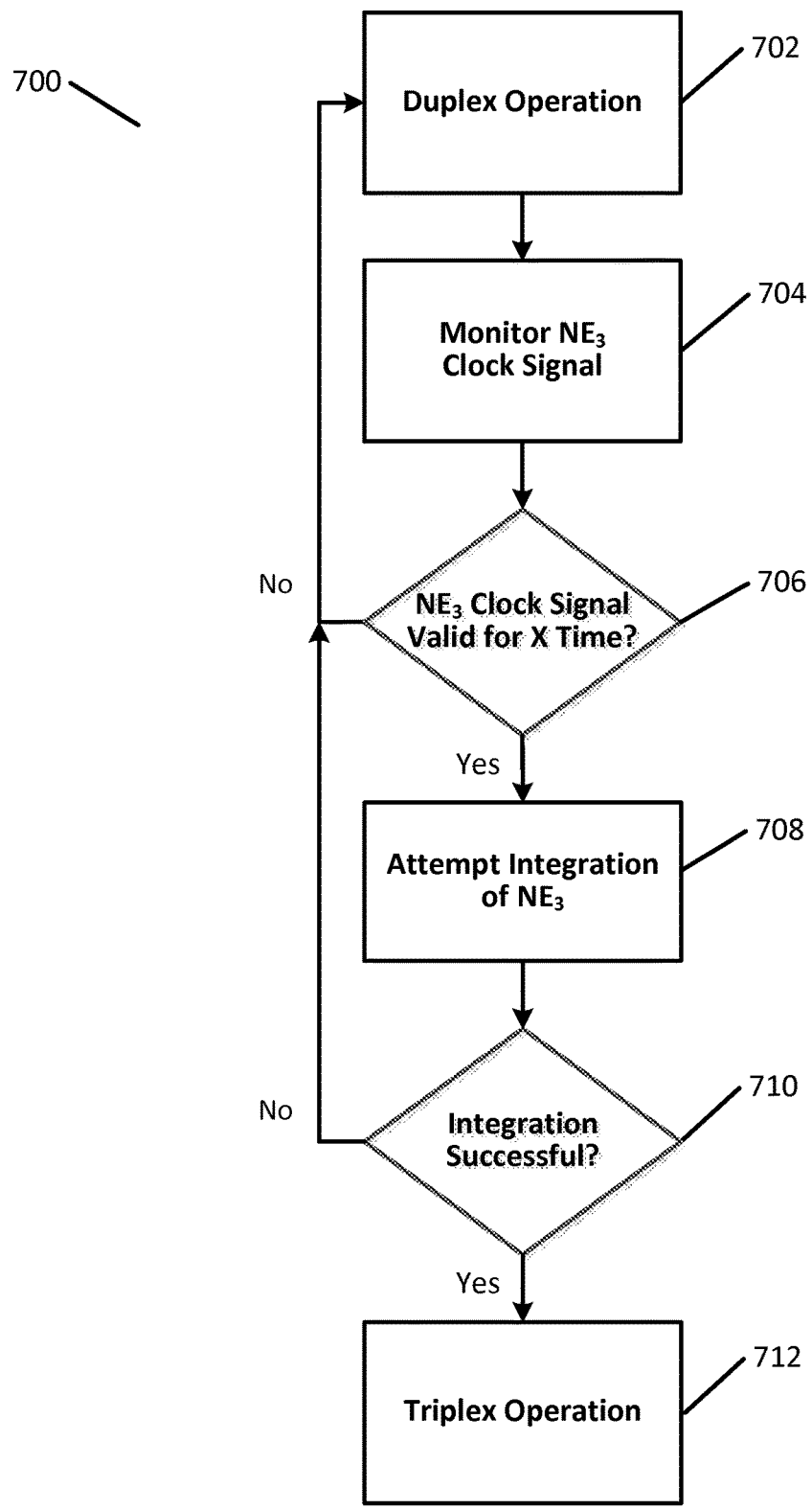
FIG. 7 is a flow diagram showing an example method for transitioning from a replicated duplex computing system to a fault-tolerant, replicated triplex computing system.

FIG. 7 is a flow diagram showing an example method 700 for transitioning from a replicated duplex computing system to a fault-tolerant, replicated triplex computing system. The method 700 can include operating in a duplex mode (step 702). The method 700 can include monitoring the clock signal of a third network element (step 704). The method 700 can include determining whether the clock signal of the third network element has been valid for a predetermined period of time (step 706). The method 700 can include entering an integration mode to attempt integration of the third network element if the clock signal of the third network element has been determined to be valid for the predetermined period of time (step 708). The method 700 can include determining whether the attempted integration has been successful (decision block 710). The method 700 can include operating in triplex mode if recovery has been deemed successful (step 712).

The method 700 can include operating in a duplex mode (step 702). In the duplex mode, a first network element and a second network element are online and operating as a replicated duplex system. A third network element is offline. The third network element may have been powered down (or never powered up) to conserve energy or because it was previously exhibiting faulty behavior. In the duplex mode, a clock monitor of the first network element can receive a clock signal of the first network element, a clock signal of the second network element, and a clock signal of the third network element. The cock monitor of the first network element can transmit, to synchronization logic of the first network element, a duplicated clock signal in place of the clock signal of the third network element. This allows the synchronization logic of the first network element to align its clock signal to two clock signals, as it would during triplex operation.

The method 700 can include monitoring the clock signal of a third network element (step 704). The clock monitor of the first network element can monitor the clock signal of the third network element. The clock monitor of the first network element can observe whether the clock signal of the third network element has a frequency and duty cycle that falls within corresponding predetermined ranges. For example, the clock monitor of the first network element can determine whether the clock signal of the third network element includes a clock pulse with a duration that falls within an acceptable predetermined range. A clock pulse may have a nominal duration of four clock cycles. Clock pulses that are shortened or lengthened to bring various clock cycles into alignment may be three clock cycles or five clock cycles in duration. However, if the duration of the clock pulse falls outside this range, the clock monitor of the first network element may determine that the clock pulse is faulty. In such case, the first network element may not attempt to bring the third network element online.

The clock monitor of the first network element can also observe whether the clock signal of the third network element has a frequency that falls within a predetermined range. The frequency of a clock signal of a healthy network element should drift little over successive clock pulses. For example, the clock monitor of the first network element can determine whether a rising edge of a clock pulse of the clock signal of the third network element arrives at an appropriate time, within an acceptable range. A clock pulse will be followed by a data transmission period of a fixed length followed by a clock preamble of a fixed length. Accordingly, the leading edge of a subsequent clock pulse from the third network element should arrive within a narrow window of time following a fixed interval of time from the leading edge of the previous clock pulse. The narrow window of time allows for shorter or longer clock pulses used for clock signal alignment. Thus, in this example, the leading edge of the subsequent clock pulse from the third network element should arrive after a fixed time plus or minus a single clock cycle. The clock signal of a healthy network element should drift very little during the interval between clock pulses. A leading edge that arrives more than one clock cycle early or late indicates a possible faulty clock signal and/or network element. If the clock monitor of the first network element detects a clock pulse arriving too early or too late, the first network element may not attempt to bring the third network element online.

The method 700 can include determining whether the clock signal of the third network element has been valid for a predetermined period of time (step 706). Even if the clock monitor of the first network element observes a valid clock signal from the third network element, it may continue to monitor that clock signal to ensure that it remains valid for an adequate duration of time before deciding that the integration of the third network element can commence. The clock monitor may continue monitoring the clock signal of the third network element for at least one clock cycle, multiple clock cycles, or up to 1 ms, 3 ms, 10 ms or longer before deeming the clock signal valid and attempting integration of the third network element. The clock monitor may use a timer to monitor the length of time during which it has received a valid clock signal. If at any point prior to the end of the predetermined period the clock monitor detects an invalid clock pulse, it can reset its timer and restart it when it begins receiving a valid clock signal again.

The method 700 can include entering an integration mode to attempt integration of the third network element if the clock signal of the third network element has been determined to be valid for the predetermined period of time (step 708). The first network element can enter an integration mode to bring the third network element online and transition to a fault-tolerant, replicated triplex operation mode. The integration mode can include the first and second network elements connecting the clock signal of the third network element to their respective synchronization logic. The integration mode can include the first and second network elements disconnecting the duplicated clock signal from their respective synchronization logic; however, it is not necessary to disconnect the duplicated clock signals from the synchronization logic if the duplicated clock signals remain valid. The integration mode can include alignment of the clock signals of the first, second, and third network element. The integration mode can include synchronization of the memory state of the third network element to that of the first and second network elements. The integration mode is described in detail with reference to FIG. 8 below.

The method 700 can include determining whether the attempted integration has been successful (decision block 710). The integration can be deemed successful if the three network elements are able to align their clock signals and synchronize their memory states. In addition, the integration can be deemed successful if none of the network elements detects or receives notification of a fault during the recovery process; for example, if the clock monitors of the first, second, and third network elements detect no invalid clock signals and the networks receive no notifications of fault from the voting circuit.

The method 700 can include operating in triplex mode if integration has been deemed successful (step 712). If the attempted integration is successful, the first, second, and third network elements can function in a fault-tolerant, replicated triplex operation mode.

FIG. 8 is a flow diagram showing an example method 800 for integrating a previously offline network element into a replicated duplex computing system to form a fault-tolerant, replicated triplex computing system. For example, the method 800 may be suitable for use as the integration step (step 708) shown in FIG. 7. The method 800 can include updating a first network element and a second network element to indicate that the third network element is online (step 802). The method 800 can include the first network element and the second network element replacing their duplicated clock signals with the clock signal from the third network element (step 804). The method 800 can include the first, second, and third network elements aligning their clock signals (step 806). The method 800 can include the first network element and the second network element transmitting synchronization data to the third network element (step 808). The method 800 can include the first network element and the second network element verifying echoed synchronization data received from the third network element (step 810). If the first network element or the second network element determines that the echoed synchronization data from the third network element does not match the synchronization data, they can terminate the recovery mode (step 812) and return to operating in duplex mode (step 814). If the first network element and the second network element determine that the echoed synchronization data from the third network element matches the synchronization data, the recovery mode can be deemed successful and the system can operate in a fault-tolerant, replicated triplex operation mode (step 816).

The method 800 can include updating a first network element and a second network element to indicate the third network element is online (step 802). For example, this status update can be triggered in response to one or both of the first or second network elements detecting that the clock signal of the third network element has been valid for a predetermined period of time. If the first network element determines that the clock signal of the third network element has been valid for a predetermined period of time, it can update the status of the third network element in its mode register and notify the second and third network elements that the third network element can be brought online. The second and third network elements can also update the status of the third network element in their respective mode registers.

The method 800 can include the first network element and the second network element replacing their duplicated clock signals with the clock signal from the third network element (step 804). Each of the first and second network elements can, via their respective switch controllers, connect the clock signal of the third network element to the synchronization logic. The first and second network elements can, via their respective switch controllers, disconnect the duplicated clock signals from the synchronization logic; however, it is not necessary to disconnect the duplicated clock signals if they are not faulty.

The method 800 can include the first, second, and third network elements aligning their clock signals (step 806). This process is described in detail with reference to FIGS. 9 and 10 below.

The method 800 can include the first network element and the second network element transmitting synchronization data to the third network element (step 808). The first and second network elements, via their respective data synchronization modules, can transmit synchronization data from each of a plurality of successive memory spaces to a data synchronization module of the third network element.

The method 800 can include the first network element and the second network element verifying echoed synchronization data received from the third network element (step 810). The data synchronization module of the third network element can transmit echoed synchronization data back to the first and second network elements. The first and second network elements can receive the echoed synchronization data from the third network element and verify that it matches the transmitted synchronization data.

If the first network element or the second network element determine that the echoed synchronization data from the third network element does not match the synchronization data, one or both of them can terminate the recovery mode (step 812) and return to operating in duplex mode (step 814). If the synchronization logic of the first network element receives echoed synchronization data that does not match the synchronization data, it can transmit a notification to the clock monitor to update the status of the third network element to offline in a mode register of the clock monitor. The clock monitor of the first network element can update the status of the third network element to offline in a mode register of the clock monitor in response to the notification. The clock monitor can then disconnect the clock signal of third network element from the synchronization logic using a switch controller of the clock monitor. The clock monitor can connect, using the switch controller, the duplicated clock signal to the synchronization logic. The clock monitor can notify the second network element and the third network element that the third network element is offline. The recovery mode can thus be terminated, and the system can return to the replicated duplex operation mode.

If the first network element and the second network element determine that the echoed synchronization data from the third network element matches the synchronization data, the recovery mode has been successful and the system can operate in triplex mode (step 816). The network elements can notify the external CPUs that the fault-tolerant, replicated triplex operation mode has been achieved.

FIG. 9 is a flow diagram showing an example method 900 for aligning clock signals in a system for replicated, fault-tolerant computing. The method 900 can include monitoring a clock signal of another network element (step 902). The method 900 can include determining whether the received clock signal is valid (step 904). If a received clock signal is determined to be not valid, the method 900 can include disconnecting the offending network element (step 906). If the received clock is determined to be valid, the method 900 can include determining whether the received clock signal is leading (step 908). If the received clock signal is leading, the method 900 can include decreasing the length of the next transmitted clock pulse (908). The method 900 can then return to step 902. If the received clock signal is not leading, the method can include determining whether the received clock signal is lagging (step 910). If the received clock signal is lagging, the method 900 can include increasing the length of the next transmitted clock pulse (step 912). The method 900 can then return to step 902. If the received clock signal is not lagging, the method 900 can return to step 902.

The method 900 can include monitoring a clock signal of another network element (step 902). The clock monitor of each network element can receive the clock signals of the other network elements. The clock monitor can monitor whether each clock signal has a frequency and a duty cycle that each fall within a predetermined acceptable range.

The method 900 can include determining whether the received clock signal is valid (step 904). If a received clock signal is determined to be not valid, the method 900 can include disconnecting the offending network element (step 906). If the clock monitor determines that either the frequency or the duty cycle of the third network element's clock signal does not fall within its predetermined acceptable ranges, the clock monitor can, via its switch controller, disconnect the clock signal of the third network element from the synchronization logic and connect a duplicated clock signal to the synchronization logic. In some implementations, the clock monitor can perform the disconnecting and connecting steps before receiving the next clock signal from a clock module of first network element. In this manner, the system can minimize the amount of time system calculations are affected by the faulty network element. The duplicated clock signal can be a duplicate of the first network element's internal clock signal or a duplicate of the remaining valid external clock signal. The clock monitor can notify the second network element and the third network element that the third network element is offline.

In some situations, the first network element will received a notification that the third network element is offline before the first network element detects an invalid clock signal from the third network element. For example, perhaps the voting circuit has transmitted the notification to the network elements upon detecting erratic data from the third network element. The switch controller of the first network element can disconnect the clock signal of the third network element from the synchronization logic. The switch controller of the first network element can connect the duplicated clock signal to the synchronization logic. The system can then continue operating in a replicated duplex operation mode.

If the received clock is determined to be valid, the method 900 can include determining whether the received clock signal is leading (step 908). The clock monitor can detect the leading edge of a received clock pulse. The clock monitor can determine whether its own clock pulse is leading or lagging the received clock pulse. If the received clock signal is leading, the method 900 can include decreasing the length of the next transmitted clock pulse (908). By decreasing the length of its next transmitted clock pulse, the clock monitor can effectively advance its internal clock signal relative to the received clock signal. The method 900 can then return to step 902.

If the received clock signal is not leading, the method can include determining whether the received clock signal is lagging (step 910). The clock monitor can detect the leading edge of a received clock pulse. If the received clock signal is lagging, the method 900 can include increasing the length of the next transmitted clock pulse (step 912). By increasing the length of its next transmitted clock pulse, the clock monitor can effectively delay its internal clock signal relative to the received clock signal. The method 900 can then return to step 902. If the received clock signal is neither leading nor lagging, the method 900 can return to step 902. In some implementations, steps 908 and 910 can occur in a single evaluation.

The method 900 can apply to a network element aligning its clock signal with two or more received clock signals. In cases where a network element is receiving two or more clock signals, the network element can determine whether its internal clock signal is leading or lagging the other clock signals by comparing it to an average, a median, or a center of the extremes of the other clock signals. This process can run iteratively until all clock signals are in alignment. During a recovery mode when a previously offline network element is being brought online, the alignment module of the previously offline network element may have to make many successive clock signal timing adjustments to bring its clock signal into alignment. As discussed previously, the alignment module may only make incremental changes during each clock pulse, so it may take several clock periods to bring the clock signals into alignment. Once all clock signals are aligned, maintaining alignment should require only occasional incremental timing adjustments. A clock pulse with timing more than a clock cycle out of alignment after a single clock period may be indicative of an invalid clock signal or a faulty network element.

FIG. 10 is a timing diagram 1000 showing an example of clock signals being brought into alignment. The drawing is not necessarily to scale, emphasis instead being placed upon illustrating the principles of the teachings. The timing diagram 1000 shows three clock signals 1002, 1004, and 1006. Each clock signal can represent the clock signal from a first, second, and third network element, respectively. Each clock signal can include a preamble 1008 of fixed duration, a clock pulse 1010, and a data transmission 1012 of fixed duration.

The preamble 1008 can include one byte of data. The byte can be eight bits of data, with four bits corresponding to a command and four bits corresponding to execution. For example, the command can include a notification that an FCR has gone offline or a request to enter a recovery mode to bring an offline FCR back online. The execution can include an identification of the FCR in question. The exact length of the preamble 1008 can be modified to suit the requirements of the design; however, once operational, the length of the preamble 1008, in clock cycles, is fixed. The preamble 1008 is drawn as a distinct segment of the signal in FIG. 10 for illustrative purposes; however, in some implementations, the preamble 1008 is included in the data transmission 1012.

The clock pulse 1010 can be adjusted to synchronize data transmission among FCRs. The clock pulse 1010 can be increased or decreased in length in order to bring the various clock pulses 1002, 1004, and 1006 into alignment. The exact nominal length of the clock pulse 1010 is not critical, but should be for a sufficient number of clock cycles to allow for small variations in length to allow for alignment of the various clock signals. In one implementation the clock pulse can nominally be four clock cycles in duration. A five clock cycle clock pulse can be used to delay a clock signal if it leads the other clock signals. A three clock cycle clock pulse can be used to advance a clock signal if it lags the other clock signals. While longer and short clocks pulses could be used to bring the various clock signals into alignment quicker, only a small adjustment in the clock pulse length should be necessary to compensate for ordinary drift of the various clocks. In other words, a previously synchronized clock pulse that is more than a clock cycle out of synchronization after a single period between clock pulses is likely faulty and should be treated as such, rather than corrected with an drastic alignment correction.

The data transmission 1012 can include operational data including data for parallel processing of instructions among the FCRs and for synchronizing the memory states of the FCRs. The data transmission 1012 can include sixty-four bytes of data, or more or fewer data bytes as appropriate for the application. In some implementations, the byte length of the data transmission 1012 includes the preamble 1008. The exact length of the data transmission 1012 can be modified to suit the requirements of the design; however, once operational, the length of the data transmission 1012, both in number of bytes and in total clock cycles, is fixed.

The timing diagram 1000 shows three clock signals 1002, 1004, and 1006 slightly out of alignment at a first time, t1. Each clock signal represents that of a different FCR. The alignment module 308 of each FCR can receive its own clock signal and the clock signals of each of the other FCRs. A first alignment module 308 within the FCR transmitting the clock signal 1002 may receive clock signals 1004 and 1006 and detect that its own clock pulse begins after that of clock signal 1006 but before that of clock signal 1004. The first alignment module 308 may therefore determine that no modification of its clock pulse is in order, and produce another clock pulse 1014 four cycles in duration. A second alignment module 308 within the FCR transmitting the clock signal 1004 may detect that its own clock pulse begins after the clock pulses of both the clock signal 1002 and the clock signal 1006. The second alignment module 308 may thus determine that its clock signal 1004 is lagging and warrants an adjustment. The second alignment module 308 can shorten the next clock pulse 1016 to three cycles in duration. As a result, at a second time t2 the clock signal 1004 is aligned with the clock signal 1002. A third alignment module 308 within the FCR transmitting the clock signal 1006 may detect that its own clock pulse begins before the clock pulses of both the clock signal 1002 and the clock signal 1006. The second alignment module 308 may thus determine that its clock signal 1004 is leading and warrants an adjustment. The third alignment module 308 can lengthen the next clock pulse 1018 to five cycles in duration. As a result, at t2 the clock signal 1006 is aligned with the clock signals 1002 and 1004. During a recovery mode when the various clock signals are further out of alignment, the process can be repeated until all clock signals are aligned. Once the clock signals are aligned, however, further adjustment may only be required occasionally and only require a single iteration of adjustment.

The drawings are not necessarily to scale, emphasis instead being placed upon illustrating the principles of the teachings. Although not reflected in the timing diagram 1000, in operation each network element will receive slightly delayed clock signals from the other network elements. In the case of duplex operation where one of the clock signals is duplicated, the principles will be the same with the expectation that two of the clock signals should always be in alignment. In addition, when an FCR duplicates its own clock signal to replace the clock signal of an offline FCR that duplicated clock signal is routed from the synchronization logic, to the clock monitor, through the switch controller 326, and back to the synchronization logic. The duplicated clock signal will thus experience a delay on the order of a clock signal received from another FCR.

The embodiments described above can be implemented in hardware, software, or a combination of hardware and software. The embodiments may be implemented in logic such as discrete logic, an ASIC, FPGA, or the like. Hardware implementation may be advantageous by providing quicker reaction time in the event of a faulty network element. Software implementations may be advantageous by providing flexibility for altering the operation of the system after deployment by using updates or patches.

While embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for providing replicated fault-tolerant computing configured to operate at least in a duplex mode and a triplex mode, the system comprising at least a first, second, and third network elements, at least one of the network elements including a processor comprising:
    synchronization logic including:
        a clock module configured to maintain a clock signal;
        an alignment module configured to synchronize the clock signal with a received clock signal;
        a data synchronization module configured to synchronize a memory state of the synchronization logic;
        a synchronization control module configured to control the alignment module and the data synchronization module; and
    a clock monitor configured to:
        receive a clock signal of the first network element, a clock signal of the second network element, and a clock signal of the third network element;
        transmit, using a switch controller of the clock monitor, a duplicated clock signal to the synchronization logic in place of the clock signal of the third network element;
        determine that the clock signal of the third network element is valid; and
        connect, using the switch controller, the clock signal of the third network element to the synchronization logic,
    wherein the data synchronization module synchronizes synchronization data of the first and/or second network elements with synchronization data of the third network element.

2. The system of claim 1, wherein the synchronization logic of the first network element is further configured to, upon determining that the clock signal of the third network element is valid, transmit a request to enter a recovery mode to the second network element.

3. The system of claim 2, wherein the data synchronization module of the first network element and the data synchronization module of the second network element are configured to:
    transmit synchronization data from each of a plurality of successive memory spaces to a data synchronization module of the third network element;
    receive echoed synchronization data from the data synchronization module of the third network element; and
    verify the echoed synchronization data.

4. The system of claim 3, wherein the data synchronization module of the first network element is further configured to:
    determine, by the data synchronization module of the first network element, that the echoed synchronization data does not match the synchronization data;
    transmit, responsive to the determination, a notification to the clock monitor that the third network element is offline; and wherein the clock monitor is further configured to:
    update, in response to the notification, a status of the third network element to offline in a mode register of the clock monitor;
    disconnect, using the switch controller, the clock signal of third network element from the alignment module;
    connect, using the switch controller, the duplicated clock signal to the alignment module; and
    notify the second network element and the third network element that the third network element is offline.

5. The system of claim 1, wherein the clock monitor is further configured to determine whether the clock signal of the third network element is valid by:
    determining that a duty cycle of the clock signal of the third network element falls within a predetermined range; and
    determining that a frequency of the clock signal of the third network element falls within a predetermined range.

6. The system of claim 5, wherein the clock monitor is further configured to determine that the clock signal of the third network element is valid by determining that the clock signal of the third network element has been valid for a predetermined period of time.

7. The system of claim 6, wherein the predetermined period is at least one clock cycle.

8. The system of claim 1, wherein the clock monitor of the first network element is configured to:
  detect an invalid clock pulse in the clock signal of the third network element;
  disconnect, using the switch controller, the clock signal of the third network element from the synchronization logic;
  connect, using the switch controller, the duplicated clock signal to the synchronization logic; and
  notify the second network element and the third network element that the third network element is offline.

9. The system of claim 8, wherein the clock monitor of the first network element is configured to disconnect the clock signal of the third network element from the synchronization logic and connect the duplicated clock signal to the synchronization logic before receiving the next clock signal from a clock module of the first network element.

10. The system of claim 1, wherein the synchronization logic of the first network element is further configured to receive, from the second network element, a notification that the third network element is offline, and wherein the clock monitor of the first network element is further configured to:
  disconnect, using the switch controller, the clock signal of the third network element from the synchronization logic; and
  connect, using the switch controller, the duplicated clock signal to the synchronization logic.

11. The system of claim 1, wherein the clock monitor of the first network element is further configured to disconnect or ignore the duplicated clock signal upon determining that the clock signal of the third network element is valid.

12. A method for providing replicated fault-tolerant computing among at least a first, second, and third network elements configured to operate at least in a duplex mode and a triplex mode, the method comprising:
  receiving, at a clock monitor of the first network element, a clock signal of the first network element, a clock signal of the second network element, and a clock signal of the third network element;
  transmitting, to synchronization logic of the first network element, a duplicated clock signal in place of the clock signal of the third network element;
  determining, by the clock monitor, that the clock signal of the third network element is valid;
  connecting, using the switch controller, the clock signal of the third network element to the synchronization logic; and
  synchronizing synchronization data of the first and/or second network elements with synchronization data of the third network element.

13. The method of claim 12, further comprising transmitting, by the synchronization logic upon determining that the clock signal of the third network element is valid, a request to enter a recovery mode to the second network element.

14. The method of claim 13, further comprising:
  transmitting, by the data synchronization module of the first network element and a data synchronization module of the second network element, synchronization data from each of a plurality of successive memory spaces to a data synchronization module of the third network element;
  receiving, by the data synchronization module of the first network element and the data synchronization module of the second network element, echoed synchronization data from the data synchronization module of the third network element; and
  verifying, by the data synchronization module of the first network element and the data synchronization module of the second network element, the echoed synchronization data.

15. The method of claim 14, further comprising:
  determining, by the data synchronization module of the first network element, that the echoed synchronization data does not match the synchronization data;
  transmitting, by the data synchronization module of the first network element, a notification to the clock monitor to update the status of the third network element to offline in a mode register of the clock monitor;
  updating, by the clock monitor in response to the notification, a status of the third network element to offline in a mode register of the clock monitor;
  disconnecting, using the switch controller, the clock signal of third network element from the alignment module;
  connecting, using the switch controller, the duplicated clock signal to the synchronization logic; and
  notifying, by the clock monitor, the second network element and the third network element that the third network element is offline.

16. The method of claim 12, wherein determining that the clock signal of the third network element is valid comprises:
  determining, by the clock monitor, that a duty cycle of the clock signal of the third network element falls within a predetermined range; and
  determining, by the clock monitor, that a frequency of the clock signal of the third network element falls within a predetermined range.

17. The method of claim 16, wherein determining that the clock signal of the third network element is valid comprises determining, by the clock monitor, that the clock signal of the third network element has been valid for a predetermined period of time.

18. The method of claim 17, wherein the predetermined period of time is at least one clock cycle.

19. The method of claim 12, further comprising:
  detecting, by the clock monitor, an invalid clock pulse in the clock signal of the third network element;
  disconnecting, using the switch controller, the clock signal of the third network element from the synchronization logic;
  connecting, using the switch controller, the duplicated clock signal to the synchronization logic; and
  notifying, by the clock monitor, the second network element and the third network element that the third network element is offline.

20. The method of claim 19, wherein the clock monitor disconnects the clock signal of the third network element from the synchronization logic and connects the duplicated clock signal to the synchronization logic before receiving the next clock signal from a clock module of first network element.

21. The method of claim 12, further comprising;
  receiving, by the synchronization logic from the second network element, a notification that the third network element is offline;
  disconnecting, using the switch controller, the clock signal of the third network element from the synchronization logic; and
  connecting, using the switch controller, the duplicated clock signal to the synchronization logic.

22. The method of claim 12, further comprising to disconnecting or ignoring, by the clock monitor, the duplicated clock signal upon determining that the clock signal of the third network element is valid.

* * * * *